US011946623B2

(12) United States Patent
Kaye et al.

(10) Patent No.: US 11,946,623 B2
(45) Date of Patent: Apr. 2, 2024

(54) MULTI-PANEL LIGHTING DEVICE

(71) Applicant: LB MARKETING, INC., Alpharetta, GA (US)

(72) Inventors: Douglas R. Kaye, Alpharetta, GA (US); Kevin Joseph Brown, Alpharetta, GA (US); Kelly Dawn Hires, Alpharetta, GA (US); Lauren Lindley, Alpharetta, GA (US); Kaif Dosani, Alpharetta, GA (US)

(73) Assignee: LB MARKETING, INC., Alpharetta, GA (US)

( * ) Notice: Subject to any disclaimer, the term of this patent is extended or adjusted under 35 U.S.C. 154(b) by 1 day.

(21) Appl. No.: 18/077,666

(22) Filed: Dec. 8, 2022

(65) Prior Publication Data

US 2023/0160559 A1 May 25, 2023

Related U.S. Application Data

(63) Continuation of application No. 17/538,504, filed on Nov. 30, 2021, now Pat. No. 11,543,101.

(60) Provisional application No. 63/246,822, filed on Sep. 22, 2021, provisional application No. 63/120,407, filed on Dec. 2, 2020.

(51) Int. Cl.

| | |
|---|---|
| ***F21V 17/00*** | (2006.01) |
| ***F21V 17/02*** | (2006.01) |
| ***F21V 23/00*** | (2015.01) |
| ***F21V 23/04*** | (2006.01) |
| ***F21Y 115/10*** | (2016.01) |

(52) U.S. Cl.

CPC ............ *F21V 17/002* (2013.01); *F21V 17/02* (2013.01); *F21V 23/003* (2013.01); *F21V 23/04* (2013.01); *F21Y 2115/10* (2016.08)

(58) Field of Classification Search

CPC ...... F21V 17/002; F21V 17/02; F21V 23/003; F21V 23/04

See application file for complete search history.

(56) References Cited

U.S. PATENT DOCUMENTS

| | | |
|---|---|---|
| 3,601,595 A | 8/1971 | Kivela |
| 4,462,064 A | 7/1984 | Schweitzer |
| 4,916,596 A | 4/1990 | Sharrah et al. |

(Continued)

FOREIGN PATENT DOCUMENTS

| | | |
|---|---|---|
| CN | 102192465 A | 9/2011 |
| GB | 2538939 A | 12/2016 |

OTHER PUBLICATIONS

7000-Lumen Multi-Directional LED Tripod Work Light by Husky, HomeDepot.com (Publication Unknown) (Last Visited: Nov. 29, 2021).

*Primary Examiner* — Bryon T Gyllstrom
(74) *Attorney, Agent, or Firm* — Perilla Knox & Hildebrandt LLP; Kenneth A. Knox

(57) ABSTRACT

Disclosed are various embodiments for a multi-panel lighting device. The multi-panel lighting device may include a primary light-emitting panel having a primary power supply and a base, and at least one auxiliary light-emitting panel coupled and detachably attached to the primary light-emitting panel. The at least one auxiliary light-emitting panel may include an auxiliary power supply such that the at least one auxiliary light-emitting panel can operate in conjunction with and/or independent of the primary light-emitting panel.

20 Claims, 23 Drawing Sheets

(56) References Cited

U.S. PATENT DOCUMENTS

| | | | | |
|---|---|---|---|---|
| 6,575,587 | B2 | 6/2003 | Cramer et al. | |
| 7,281,826 | B2 | 10/2007 | Huang | |
| 7,347,573 | B1 * | 3/2008 | Isler | A61B 5/0079 359/860 |
| 7,549,770 | B2 | 6/2009 | Devaney et al. | |
| 7,635,195 | B2 | 12/2009 | Tarter | |
| 7,824,068 | B2 * | 11/2010 | Wulfinghoff | F21S 6/003 362/249.03 |
| 8,038,311 | B2 | 10/2011 | Lau | |
| 8,113,681 | B2 | 2/2012 | Dallas et al. | |
| 8,240,769 | B1 | 8/2012 | Story et al. | |
| 8,459,836 | B2 * | 6/2013 | Chang | F21V 21/30 362/249.02 |
| 8,474,995 | B2 | 7/2013 | Lau | |
| 8,545,040 | B2 | 10/2013 | Berken | |
| 8,545,069 | B2 | 10/2013 | McCaslin et al. | |
| 8,662,699 | B2 | 3/2014 | Tarter | |
| 9,080,730 | B2 | 7/2015 | Popper et al. | |
| 9,163,793 | B2 | 10/2015 | Popper et al. | |
| 9,205,774 | B2 * | 12/2015 | Kennemer | F21L 14/00 |
| 10,091,854 | B1 | 10/2018 | Brandon, II | |
| 10,215,383 | B2 | 2/2019 | Grider et al. | |
| 10,429,013 | B1 * | 10/2019 | Fang | F21L 2/00 |
| 10,465,863 | B2 * | 11/2019 | Hou | F21L 4/04 |
| 10,995,940 | B2 | 5/2021 | Kaye et al. | |
| 2005/0174753 | A1 | 8/2005 | Cao et al. | |
| 2008/0253109 | A1 | 10/2008 | Canino et al. | |
| 2008/0298048 | A1 | 12/2008 | Garrity et al. | |
| 2009/0052181 | A1 | 2/2009 | Mao | |
| 2009/0168422 | A1 * | 7/2009 | Chiu | F21V 21/30 362/249.03 |
| 2009/0290347 | A1 * | 11/2009 | Lodhie | F21K 9/00 362/249.02 |
| 2010/0053942 | A1 | 3/2010 | Tarter et al. | |
| 2011/0075409 | A1 | 3/2011 | Zheng | |
| 2012/0008309 | A1 | 1/2012 | Hale | |
| 2013/0271993 | A1 * | 10/2013 | Jan | F21V 14/02 362/249.1 |
| 2015/0285447 | A1 | 10/2015 | Inskeep | |
| 2016/0320006 | A1 | 11/2016 | Ip | |
| 2017/0211759 | A1 | 7/2017 | Qiu | |
| 2017/0284646 | A1 | 10/2017 | Arena et al. | |
| 2018/0187869 | A1 | 7/2018 | Wiegel et al. | |
| 2018/0202639 | A1 | 7/2018 | Kao | |
| 2018/0231234 | A1 | 8/2018 | Bian | |
| 2021/0120902 | A1 | 4/2021 | Kaye et al. | |
| 2021/0172588 | A1 | 6/2021 | Kaye et al. | |

* cited by examiner

FIG. 2
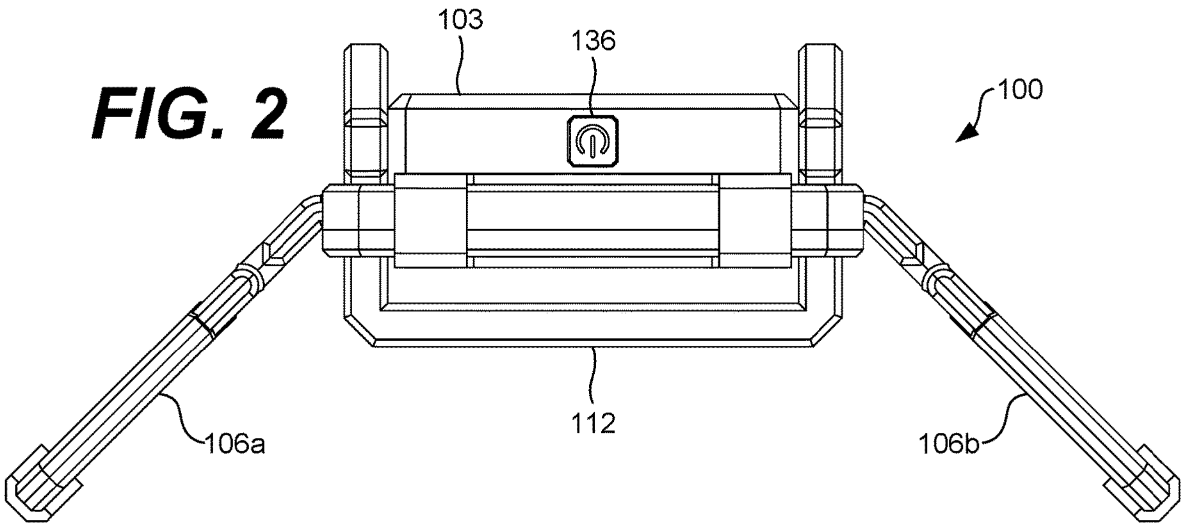
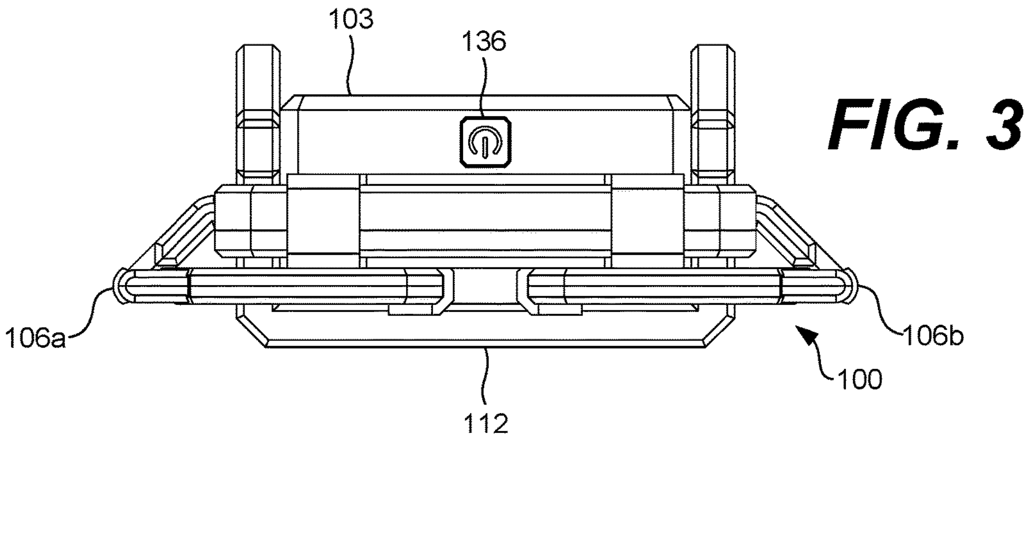
FIG. 3

FIG. 30
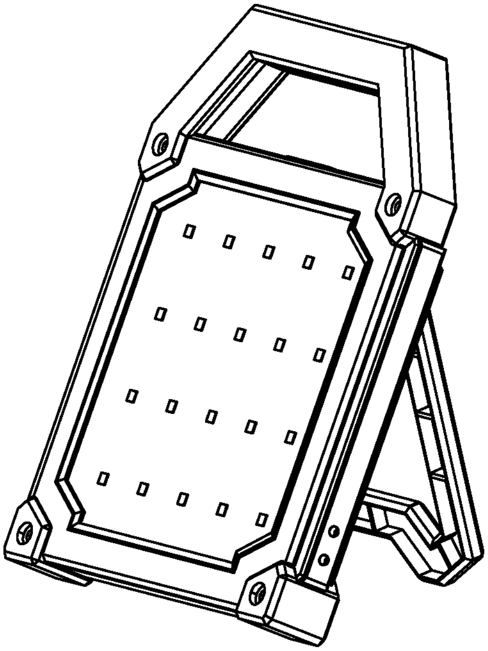
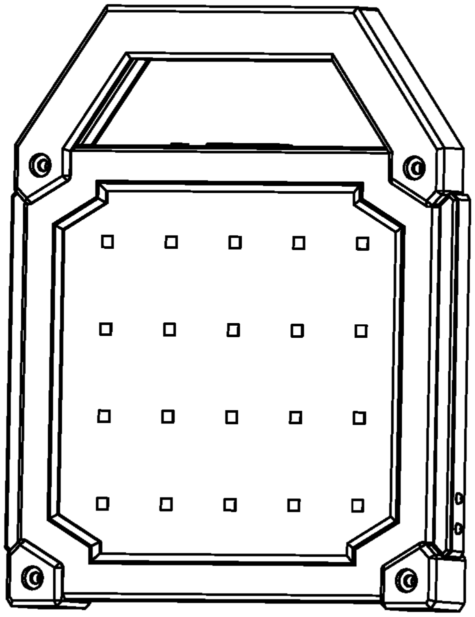
FIG. 31

MULTI-PANEL LIGHTING DEVICE

CROSS-REFERENCE TO RELATED APPLICATIONS

This application is a continuation of U.S. patent application Ser. No. 17/538,504 entitled "MULTI-PANEL LIGHTING DEVICE," filed Nov. 30, 2021, which claims the benefit of U.S. Provisional Patent Application No. 63/246,822 entitled "MULTI-PANEL LIGHTING DEVICE," filed Dec. 2, 2019, and U.S. Provisional Patent Application No. 63/246,822 entitled "MULTI-PANEL LIGHTING DEVICE," filed Sep. 22, 2021, the contents of which being incorporated by reference in their entireties herein.

BACKGROUND

Area lights, such as lanterns and work lights, have existed for decades with little to no innovation. Traditionally, work lights, such as those used in a garage or industrial facility, must be plugged in to operate and must be repeatedly pivoted to adjust an angle of illumination. Continuously moving a work light from one area to another during a project is not ideal and can be cumbersome. Lanterns, on the other hand, offer more flexibility as lanterns can be conveniently relocated from one area to another. However, it is difficult to orient the illumination provided by a lantern and lanterns tend to be bulky such that they cannot be used in many spaces and various applications. Also, for difficult areas to illuminate, lanterns require use of a hand of an operator, preventing the operator from utilizing both hands to complete a task.

FIELD OF THE INVENTION

The present invention relates to a portable lighting device. More specifically, the present invention relates to a portable multi-panel lighting device having independently illuminating and removable auxiliary lighting devices.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 2 is a top view of the multi-panel lighting device with auxiliary light-emitting panels extending at first angles in accordance with various embodiments of the present disclosure.

FIG. 3 is another top view of the multi-panel lighting device with auxiliary light-emitting panels extending at second angles in accordance with various embodiments of the present disclosure.

FIG. 30 is a side perspective view of the auxiliary light-emitting panel of the multi-panel lighting device of FIGS. 25 and 26 in accordance with various embodiments of the present disclosure.

FIG. 31 is a front perspective view of the auxiliary light-emitting panel of the multi-panel lighting device of FIGS. 25 and 26 in accordance with various embodiments of the present disclosure.

DETAILED DESCRIPTION

Figure 1:
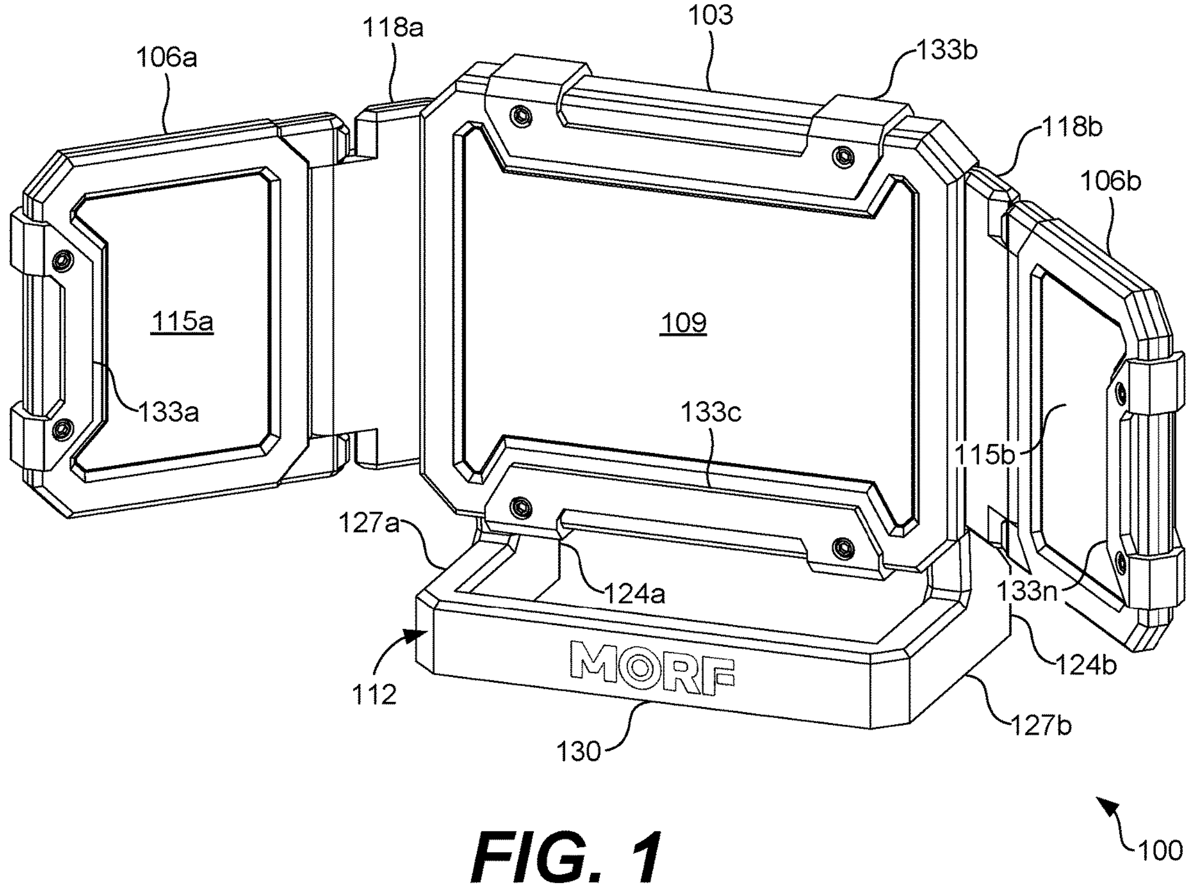
FIG. 1 is a perspective view of a multi-panel lighting device including a primary light-emitting panel and one or more auxiliary light-emitting panels in accordance with various embodiments of the present disclosure.

The present disclosure relates to a multi-panel lighting device having independently illuminating and removable auxiliary lighting devices. As noted above, area lights, such as lanterns and work lights, have existed for decades with little to no innovation. While lanterns offer some flexibility as a light source, as lanterns can be conveniently relocated from one area to another, it tends to be difficult to orient the illumination provided by a lantern and lanterns tend to be bulky such that they cannot be used in many spaces and various applications. Also, for difficult areas to illuminate, lanterns require use of a hand of an operator, preventing the operator from utilizing both hands to complete a task.

Accordingly, a multi-panel lighting device is described, where the multi-panel lighting device includes a primary light-emitting panel comprising a primary power supply and a base, and at least one auxiliary light-emitting panel rotatably coupled and detachably attached to the primary light-emitting panel. The at least one auxiliary light-emitting panel may be, for example, a first auxiliary light-emitting panel comprising a first auxiliary power supply and a second auxiliary light-emitting panel comprising a second auxiliary power supply.

The first auxiliary light-emitting panel and the second auxiliary light-emitting panel may each be configured to detachably attach to at least one of a first side and a second side of the primary light-emitting panel. The first auxiliary light-emitting panel and the second auxiliary light-emitting panel may each include a lighting panel rotatably coupled to a panel base, at least one embedded magnet configured to couple to a magnet of the primary light-emitting panel, and at least one charging contact configured to couple to a charging contact of the primary light-emitting panel.

The panel base may include a first section that is substantially uniform and a second section defining a handle aperture such that the auxiliary light-emitting panel can be held via a handle. The lighting panel may be rotatably coupled to the panel base, such that an angle between the lighting panel and the panel base is adjustable between approximately 0 to 270 degrees. Further, the base may raise the primary light-emitting panel from a surface on which the base rests and the primary light-emitting panel may be pivotably coupled to the base.

The primary light-emitting panel may include processing circuitry configured to power the at least one auxiliary light-emitting panel and recharge the auxiliary power supply of the at least one auxiliary light-emitting panel. The processing circuitry of the primary light-emitting panel may be further configured to illuminate the primary light-emitting panel in response to a toggling of a switch located on the primary light-emitting panel and the at least one auxiliary light-emitting panel when attached to the primary light-emitting panel.

In the following discussion, a general description of a multi-panel lighting device having independently illuminating and removable auxiliary lighting devices is provided, followed by a discussion of operation of the same.

Referring now to FIG. 1, a top perspective view of multi-panel lighting device 100 is shown in accordance with various embodiments. The multi-panel lighting device 100 includes a primary light-emitting panel 103 and one or more auxiliary light-emitting panels 106*a*, 106*b* (collectively "auxiliary light-emitting panels 106"). Specifically, FIG. 1 depicts two auxiliary light-emitting panels 106; however, it is understood that the multi-panel lighting device 100 can include other suitable number of auxiliary light-emitting panels 106, such as one, three, four, or other desired number.

The primary light-emitting panel 103 may include a primary light-emitting region 109, a primary power supply (not shown), processing circuitry (not shown), and a base 112, among other components as will be described. Similarly, the auxiliary light-emitting panels 106 may include auxiliary light-emitting regions 115*a*, 115*b* (collectively "auxiliary light-emitting regions 115"). It is understood that one or more light-emitting diodes (LEDs), bulbs, or other lighting apparatus may be positioned in the primary light-emitting panel 103 and the auxiliary light-emitting panels 106, such that light is illuminated in the auxiliary light-emitting regions 115 and the primary light-emitting region 109.

The primary light-emitting panel 103 may be pivotably coupled to the base 112, such that the primary light-emitting panel 103 may be rotated about an axis parallel to a surface on which the primary light-emitting panel 103 and the base 112 rest. Additionally, as shown in FIG. 1, the base 112 may raise the primary light-emitting panel 103 from a surface on which the base 112 rests. In alternative embodiments, however, the primary light-emitting panel 103 may be configured to be positioned directly on a ground surface.

The auxiliary light-emitting panels 106 are rotatably coupled and detachably attached to the primary light-emitting panel 103. However, when removed, the auxiliary light-emitting panels 106 may operate and illuminate independent of the primary light-emitting panel 103. As such, the auxiliary light-emitting panels 106 may include an auxiliary power supply (not shown) separate and independent from the primary power supply, processing circuitry (not shown), a panel base 118*a*, 118*b*, as well as other components as will be described. More specifically, the first auxiliary light-emitting panel 106*a* may include a first auxiliary power supply and, similarly, the second auxiliary light-emitting panel 106*b* may include a second auxiliary power supply.

The first auxiliary light-emitting panel 106*a* and the second auxiliary light-emitting panel 106*b* are each configured to detachably attach to at least one of a first side and a second side of the primary light-emitting panel 103. For instance, as shown in FIG. 1, the first auxiliary light-emitting panel 106*a* is detachably attached to a first side (e.g., a left side) of the primary light-emitting panel 103, and the second auxiliary light-emitting panel 106*b* is detachably attached to a second side of the primary light-emitting panel 103. As such, the auxiliary light-emitting panels 106 extend horizontally from the primary light-emitting panel 103 without contacting a ground surface. As the auxiliary light-emitting panels 106 are coupled to the primary light-emitting panel 103 at a single side, the auxiliary light-emitting panels 106 may be described as in a cantilever arrangement with the primary light-emitting panel 103.

A coupling between the auxiliary light-emitting panels 106 and the primary light-emitting panel 103 may include a snap connection, an interference connection, a magnetic connection, and/or other suitable connection. To this end, the first auxiliary light-emitting panel 106*a* and the second auxiliary light-emitting panel 106*b* may each include one or more embedded magnets (not shown) configured to couple to a magnet of the primary light-emitting panel 103 such that a magnetic connection is formed between the auxiliary light-emitting panels 106 and the primary light-emitting panel 103.

The base 112 of the primary light-emitting panel 103 may include vertically-extending legs 124*a*, 124*b* (collectively "vertically-extending legs 124") coupled to ground members 127*a*, 127*b* (collectively "ground members 127"), where a horizontal ground support 130 extends between the ground members 127. The first ground member 127*a* may be coupled and perpendicular to the first vertically-extending leg 124*a*, the second ground member 127*b* may be coupled and perpendicular to the second vertically-extending leg 124*b*, and the horizontal ground support 130 may be coupled to a front portion of the first ground member 127*a* and the second ground member 127*b*.

The primary light-emitting panel 103 and/or the auxiliary light-emitting panels 106 may include one or more bumpers 133*a* . . . 133*n* (collectively "bumpers 133") that prevent damage to the multi-panel lighting device 100 during operation. For instance, the bumpers 133 may come into contact with the ground and other surfaces such that any processing circuitry or lighting apparatus are not damaged or broken during transportation or use. As such, the bumpers 133 may be formed of rubber, soft plastic, or other suitable force absorbing material.

Referring next to FIGS. 2 and 3, tops views of the multi-panel lighting device 100 are shown. More specifically, FIGS. 2 and 3 show the auxiliary light-emitting panels 106 rotated in various positions. As noted above, the auxiliary light-emitting panels 106 are rotatably coupled to the primary light-emitting panel 103 such that the auxiliary light-emitting panels 106 may be rotated about an axis perpendicular to a ground surface. For instance, FIG. 2 depicts the auxiliary light-emitting panels 106 being rotated outwards to an open position, whereas FIG. 3 depicts the auxiliary light-emitting panels 106 being rotated inwards such that the auxiliary light-emitting panels 106 cover the primary light-emitting region 109, which may protect the primary light-emitting panel 103 during transport or non-use.

In some embodiments, the primary light-emitting panel 103 may include processing circuitry configured to power the auxiliary light-emitting panels 106 and recharge the auxiliary power supply of the auxiliary light-emitting panels 106, for instance, when the auxiliary light-emitting panels 106 are attached to the primary light-emitting panel 103. In further embodiments, the processing circuitry of the primary light-emitting panel 103 is further configured to illuminate the primary light-emitting panel 103 in response to a toggling of a switch 136 located on the primary light-emitting panel 103 as well as the auxiliary light-emitting panels 106 when they are attached to the primary light-emitting panel 103.

Figure 4:
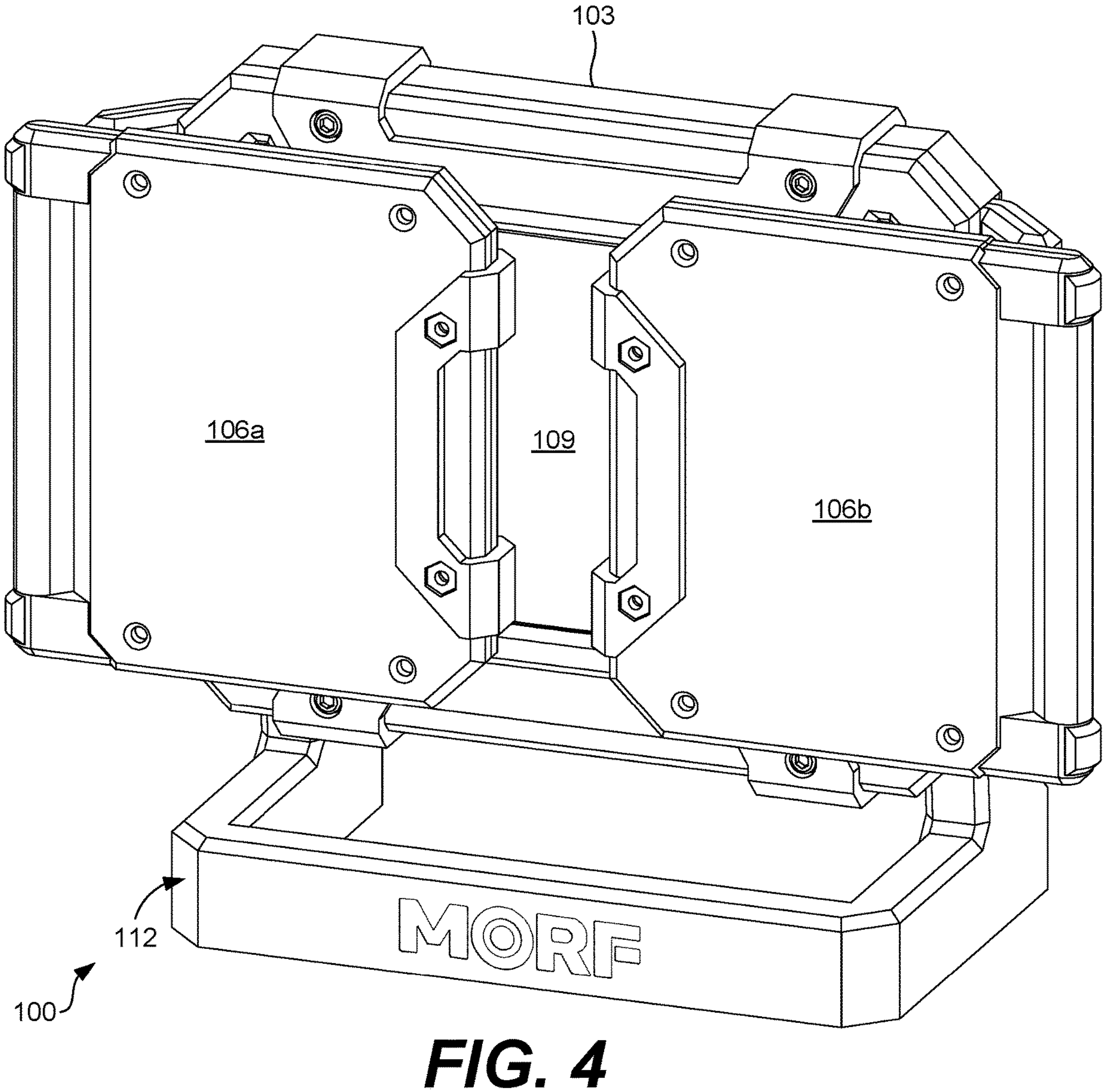
FIG. 4 is another perspective view of the multi-panel lighting device with auxiliary light-emitting panels adjusted to cover a primary light-emitting panel in accordance with various embodiments of the present disclosure.

FIG. 4 is a perspective view of the multi-panel lighting device 100 in the state shown in FIG. 3. Specifically, FIG. 4 depicts the auxiliary light-emitting panels 106 being rotated inwards such that the auxiliary light-emitting panels 106 cover the primary light-emitting region 109, which again may protect the primary light-emitting panel 103 during transport or non-use.

Figure 5:
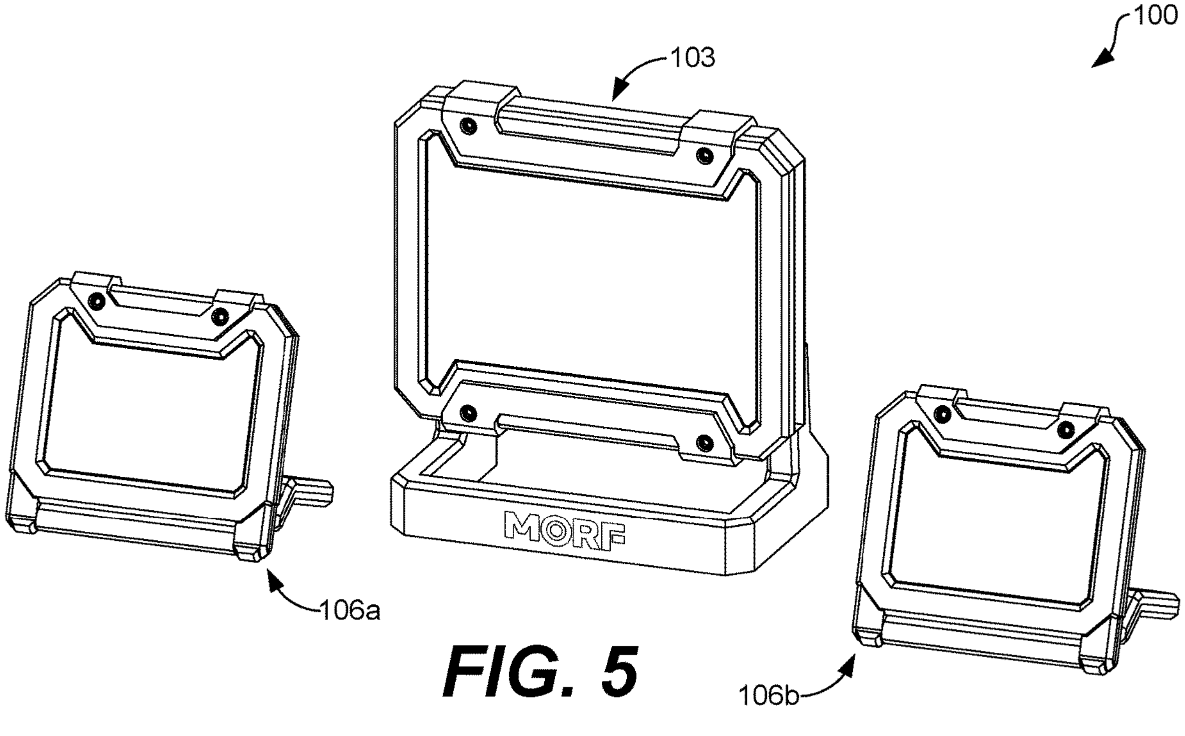
FIG. 5 is a perspective view of the multi-panel lighting device with the auxiliary light-emitting panels removed from the primary light-emitting panel in accordance with various embodiments of the present disclosure.

Moving along to FIG. 5, a perspective view of the multi-panel lighting device 100 is shown with the auxiliary light-emitting panels 106 removed from the primary light-emitting panel 103 in accordance with various embodiments of the present disclosure. Specifically, the auxiliary light-emitting panels 106 may be removed and configured such that the auxiliary light-emitting panels 106 may operate as sources of illumination independent of the primary light-emitting panel 103. However, when the auxiliary light-emitting panels 106 are coupled to the primary light-emitting panel 103, as shown in FIG. 6, the primary light-emitting panel 103 and the auxiliary light-emitting panels 106 may collectively provide illumination.

Figure 6:
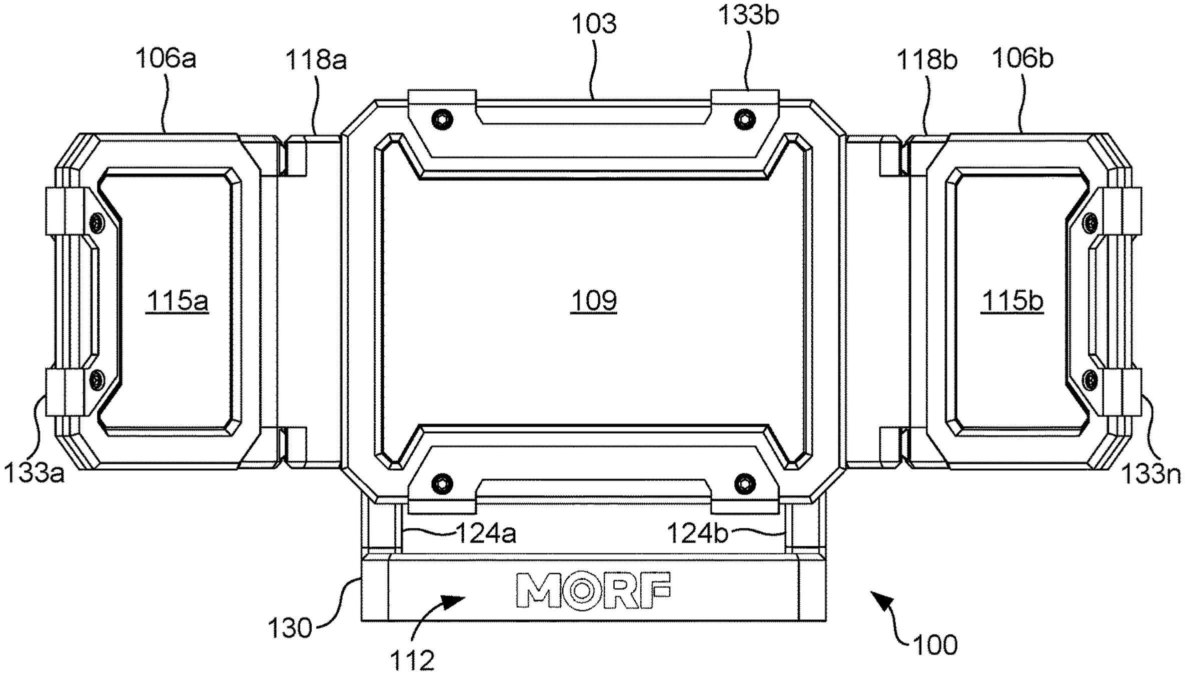
FIG. 6 is a front view of the multi-panel lighting device in accordance with various embodiments of the present disclosure.
Figure 7:
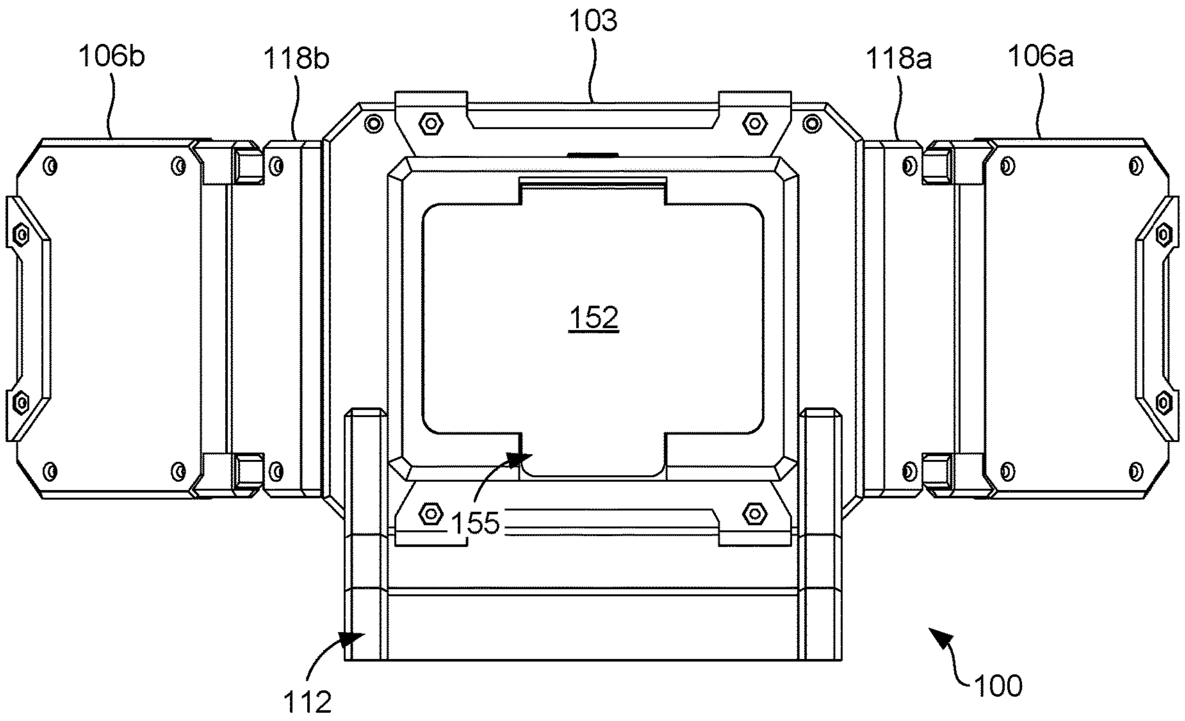
FIG. 7 is a rear view of the multi-panel lighting device in accordance with various embodiments of the present disclosure.

Turning now to FIGS. 6 and 7, FIG. 6 is a front view of the multi-panel lighting device 100 and FIG. 7 is a rear view of the multi-panel lighting device 100 in accordance with various embodiments of the present disclosure. As shown in FIG. 7, the primary light-emitting panel 103 may include a power supply cover 152, which may cover a suitable power supply, such as one or more removeable and/or rechargeable batteries. The power supply cover 152 may include a tab 155 that forms a snap connection with a rear surface of the primary light-emitting panel 103, as may be appreciated.

Figure 8:
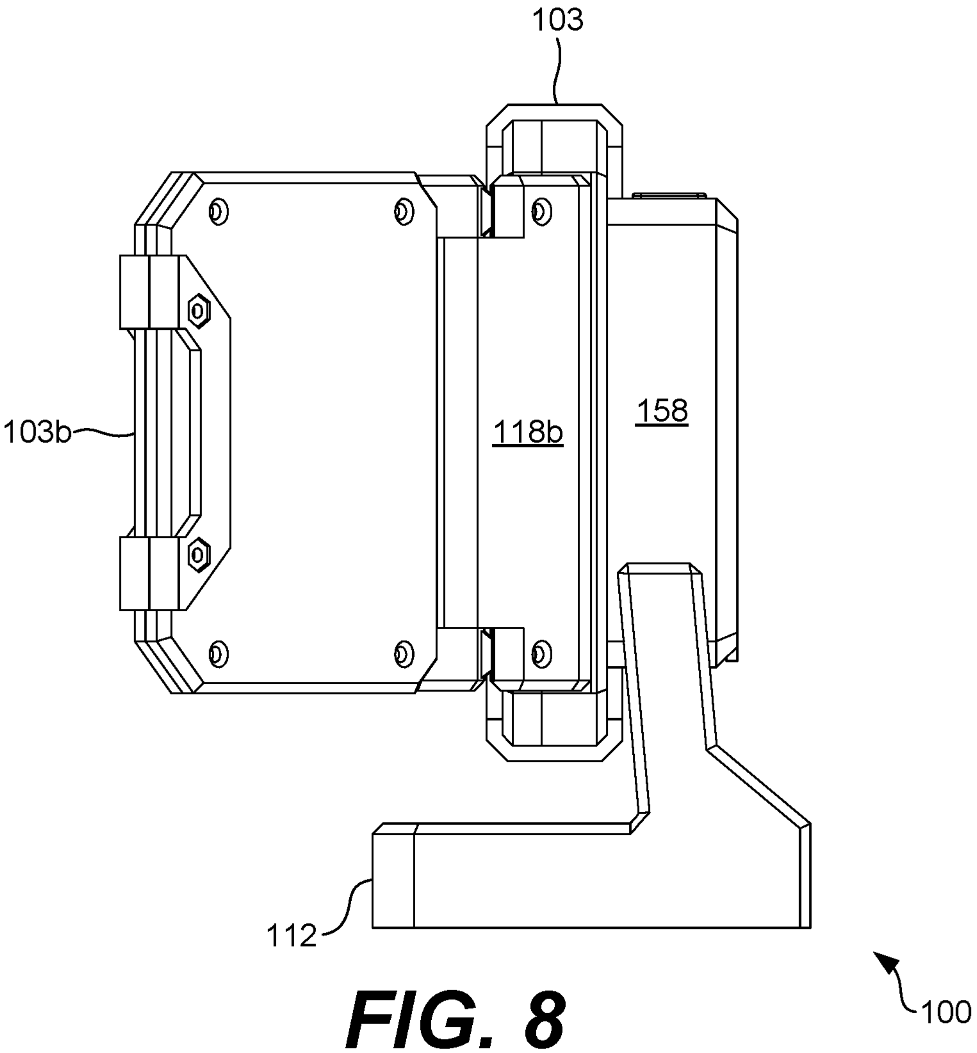
FIG. 8 is a side view of the multi-panel lighting device in accordance with various embodiments of the present disclosure.
Figure 9:
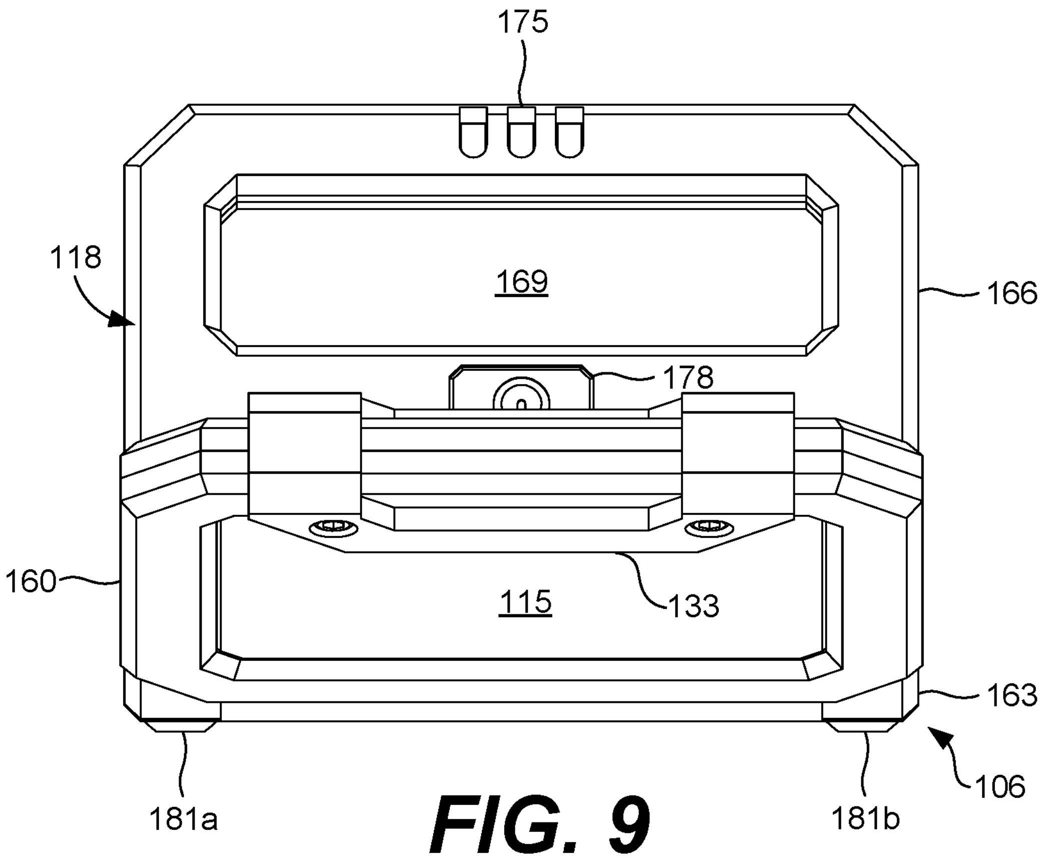
FIG. 9 is a top perspective view of an auxiliary light-emitting panel of the multi-panel lighting device in accordance with various embodiments of the present disclosure.

FIG. 8 is a side view of the multi-panel lighting device 100 in accordance with various embodiments of the present disclosure. As noted above, the primary light-emitting panel 103 may be pivotably coupled to the base 112, such that the primary light-emitting panel 103 may be rotated about an axis parallel to a surface on which the primary light-emitting panel 103 and the base 112 rest (e.g., pitch) and/or an axis perpendicular to a surface on which the primary light-emitting panel 103 and the base 112 rest (e.g., yaw). To this end, a rear projecting portion 158 of the primary light-emitting panel 103 may be pivotably coupled to a projecting portion of the base 112. Additionally, as shown in FIG. 1, the base 112 may raise the primary light-emitting panel 103 from a surface on which the base 112 rests. In alternative embodiments, however, the primary light-emitting panel 103 may be configured to be positioned directly on a ground surface.

Figure 10:
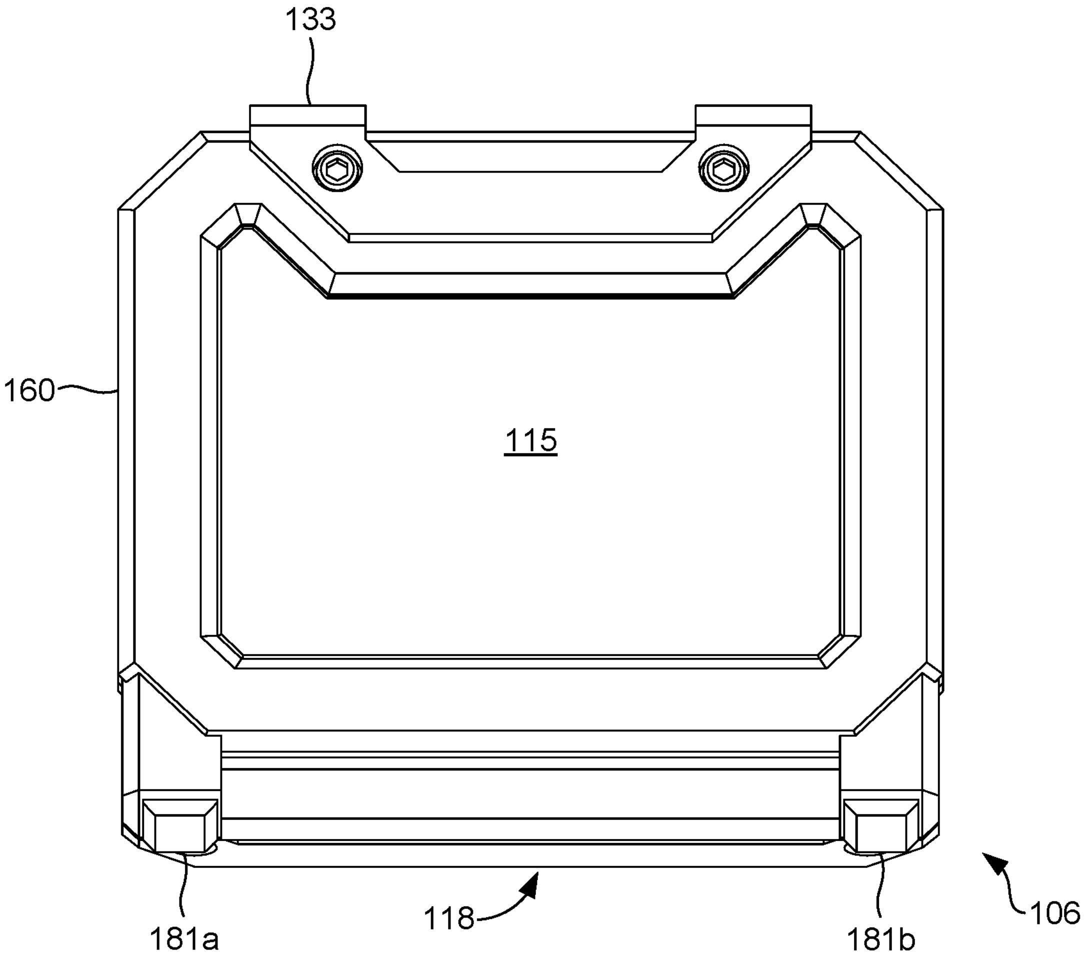
FIG. 10 is a front elevation view of an auxiliary light-emitting panel of the multi-panel lighting device in accordance with various embodiments of the present disclosure.
Figure 11:
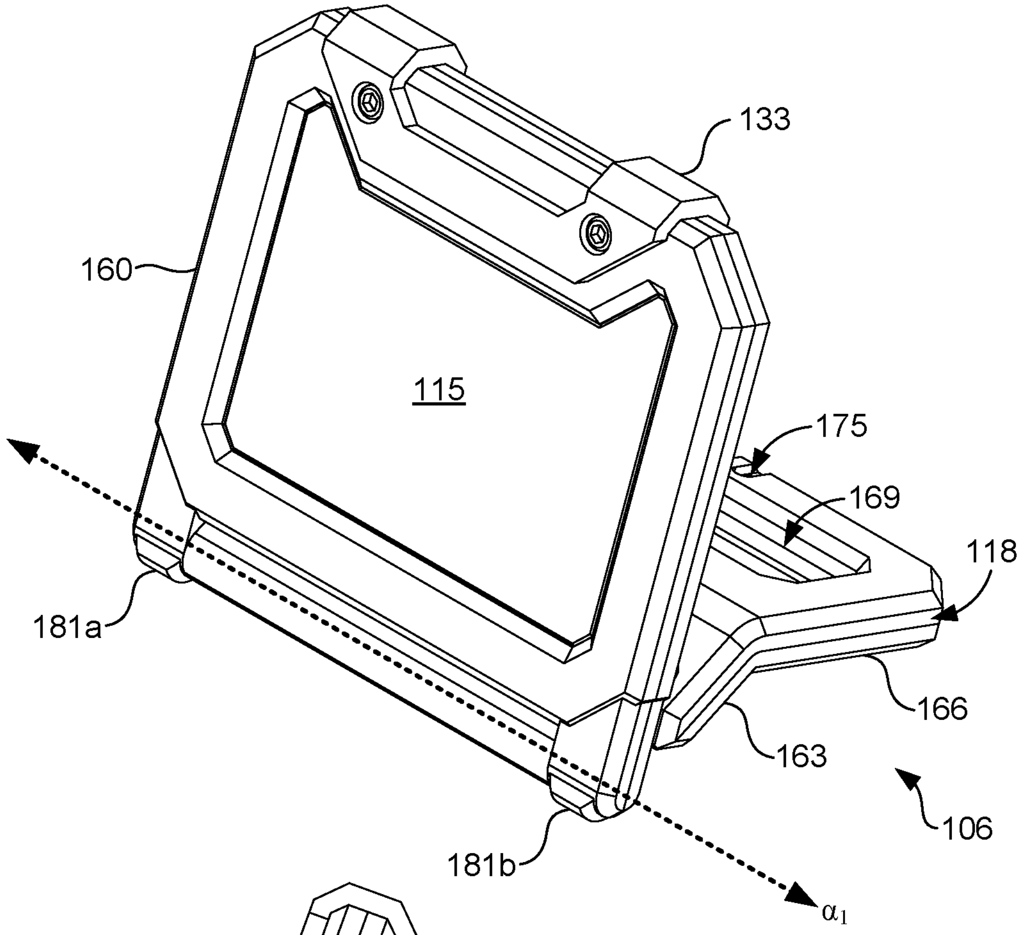
FIG. 11 is a top perspective view of an auxiliary light-emitting panel of the multi-panel lighting device in accordance with various embodiments of the present disclosure.
Figure 12:
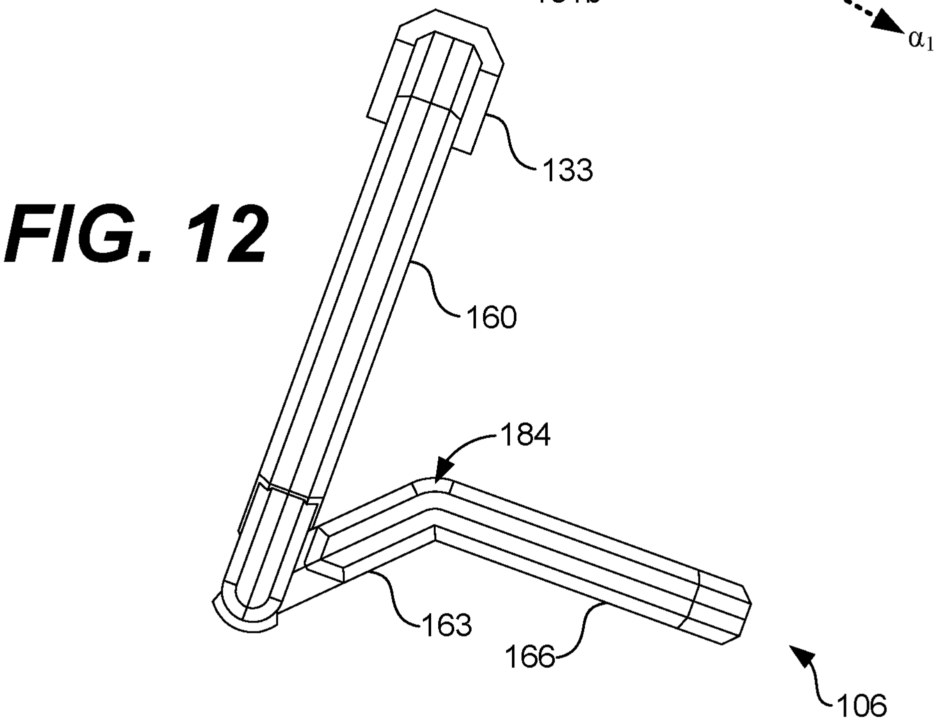
FIG. 12 is a side view of an auxiliary light-emitting panel of the multi-panel lighting device in accordance with various embodiments of the present disclosure.

Referring now to FIGS. 9-12, FIG. 9 is a top perspective view, FIG. 10 is a front elevation view, FIG. 11 is another top perspective view, and FIG. 12 is a side view of the auxiliary light-emitting panel 106 of the multi-panel lighting device 100 in accordance with various embodiments of the present disclosure. The auxiliary light-emitting panel 106 may include the first auxiliary light-emitting panel 106*a*, the second auxiliary light-emitting panel 106*b*, or other auxiliary light-emitting panels.

Referring to the auxiliary light-emitting panel 106 of FIGS. 9-12, by way of example, the first auxiliary light-emitting panel 106*a* may include a lighting panel 160 rotatably coupled to a panel base 118 such that the lighting panel 160 may rotate relative to the panel base 118 about an axis al, as shown in FIG. 11. In some embodiments, the panel base 118 may include a first section 163 that is substantially uniform and a second section 166 comprising a handle aperture 169.

The second section 166 of the panel base 118 may include one or more embedded magnets (not shown) disposed therein that are configured to couple to a magnet of the primary light-emitting panel 103 such that a magnetic connection is formed. Additionally, the second section 166 of the panel base 118 may include one or more auxiliary charging contacts 175 configured to couple to a charging contact of the primary light-emitting panel 103.

The auxiliary light-emitting panel 106 may include an auxiliary panel switch 178 that toggles a source of illumination, which may be positioned on the first section 163, the second section 166, or the lighting panel 160. Further, in some embodiments, the auxiliary light-emitting panel 106 may include panel feet 181*a*, 181*b* (collectively "panel feet 181"), which may include rubber, soft plastic, or other suitable force absorbing material.

Referring to FIGS. 11 and 12, the first section 163 may be coupled to the second section 166 at a bend 184, wherein an angle between the first section 163 and the second section 166 at the bend 184 is between approximately 90 to 180 degrees, such that a kickstand may be formed, as shown in FIG. 12. Further, in some embodiments, the lighting panel 160 may be pivotably coupled to the first section 163, thereby providing an adjustable tri-folding mechanism as shown in FIG. 12.

Figure 13:
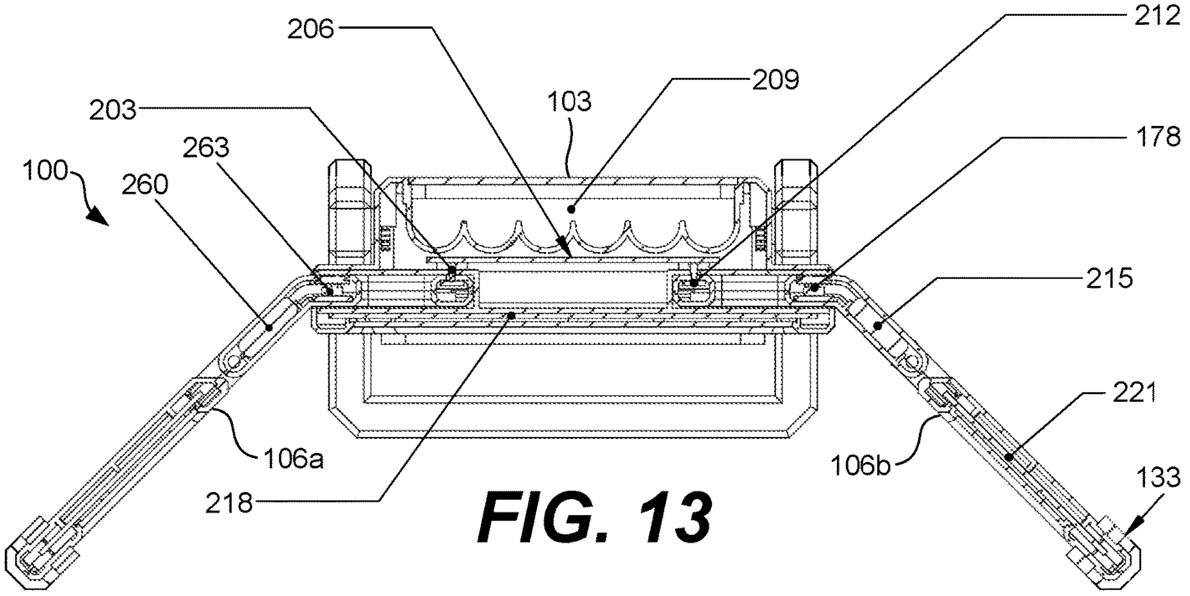
FIG. 13 is a top cross-sectional view of the multi-panel lighting device in accordance with various embodiments of the present disclosure.
Figure 14:
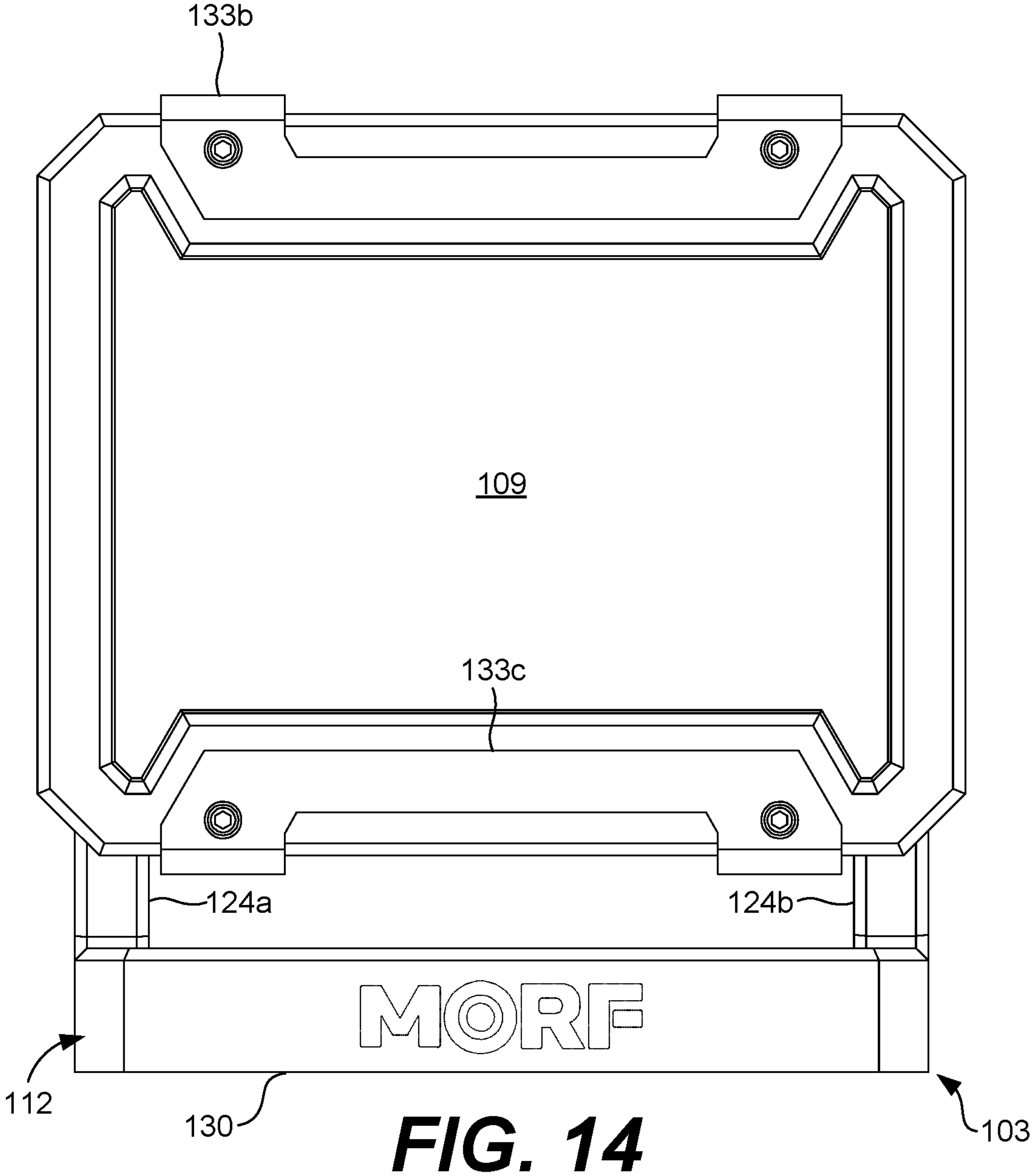
FIG. 14 is a front view of the multi-panel lighting device with the auxiliary light-emitting panels removed from the primary light-emitting panel in accordance with various embodiments of the present disclosure.

Referring next to FIGS. 13 and 14, a top cross-sectional view of the multi-panel lighting device 100 and a front view of the multi-panel lighting device 100 with the auxiliary light-emitting panels 106 removed from the primary light-emitting panel 103 are shown, respectively, in accordance with various embodiments of the present disclosure. In addition to the foregoing, the multi-panel lighting device 100 includes primary panel charging pins 203, a primary panel printed circuit board (PCB) 206, a power supply compartment 209 (e.g., a battery compartment), charging contacts 212, an auxiliary panel switch 178, an auxiliary power supply 215 (e.g., a lithium polymer (LiPo) battery), a primary LED panel 218, an auxiliary LED Panel 221, a bumper 133 (e.g., a rubber bumper), a battery 260, and a switch 263.

Figure 15:
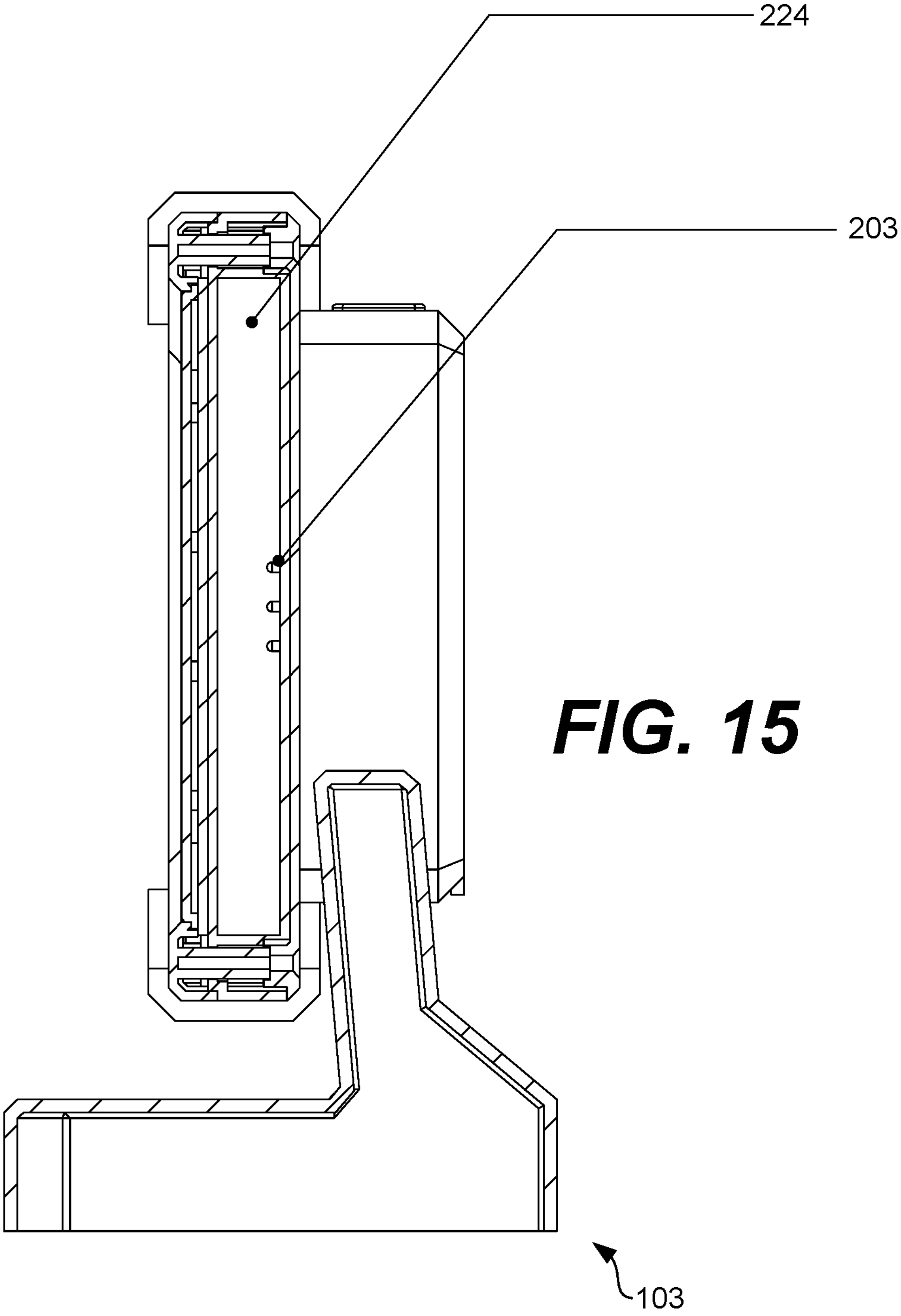
FIG. 15 is a cross-section view of the primary light-emitting panel of the multi-panel lighting device in accordance with various embodiments of the present disclosure.

FIG. 15 is a cross-section view of the primary light-emitting panel 103 of the multi-panel lighting device 100 in accordance with various embodiments of the present disclosure. Notably, the primary panel charging pins 203 are shown relative to a docketing area 224 where an auxiliary light-emitting panel 106 is coupled to the primary light-emitting panel 103.

Figure 16:
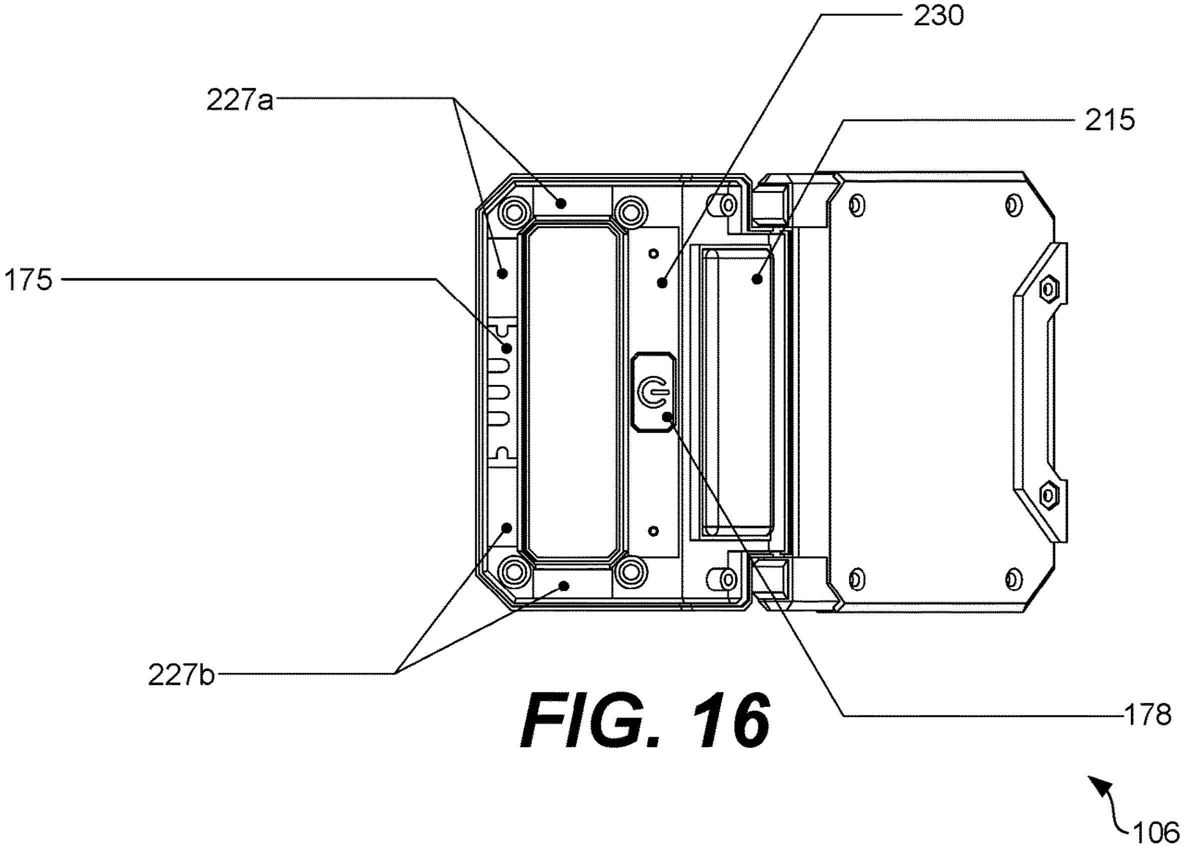
FIG. 16 is top perspective, cross-sectional view of an auxiliary light-emitting panel in accordance with various embodiments of the present disclosure.

FIG. 16 is top perspective, cross-sectional view of an auxiliary light-emitting panel 106 in accordance with various embodiments of the present disclosure. The auxiliary light-emitting panel 106 may further include auxiliary charging contacts 175 configured to electrically couple to the primary panel charging pins 203, magnets 227*a*, 227*b* (collectively, magnets 227), an auxiliary panel switch 178, an auxiliary PCB 230 (e.g., processing circuitry), and an auxiliary power supply 215 (e.g., a LiPo battery).

Figure 17:
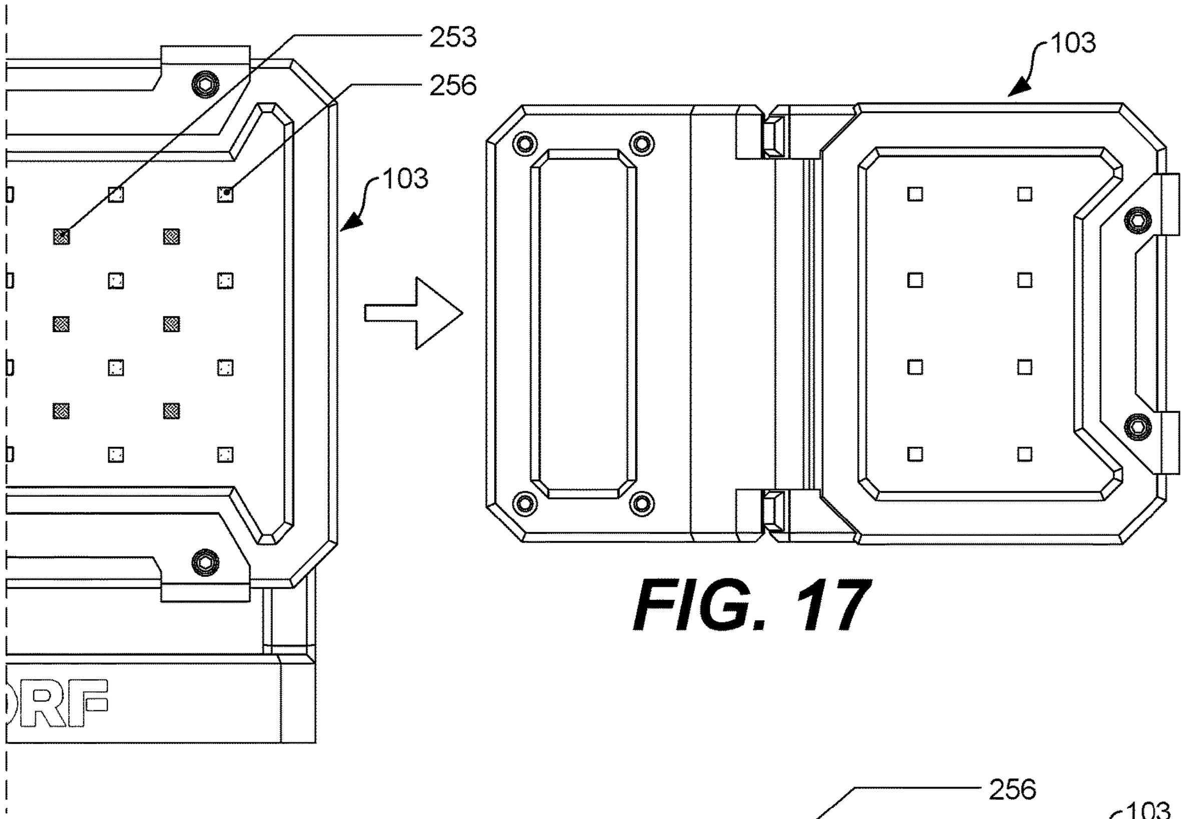
FIG. 17 is a partial front view of the primary light-emitting panel and a full perspective of an auxiliary light-emitting panel in accordance with various embodiments of the present disclosure.
Figure 18:
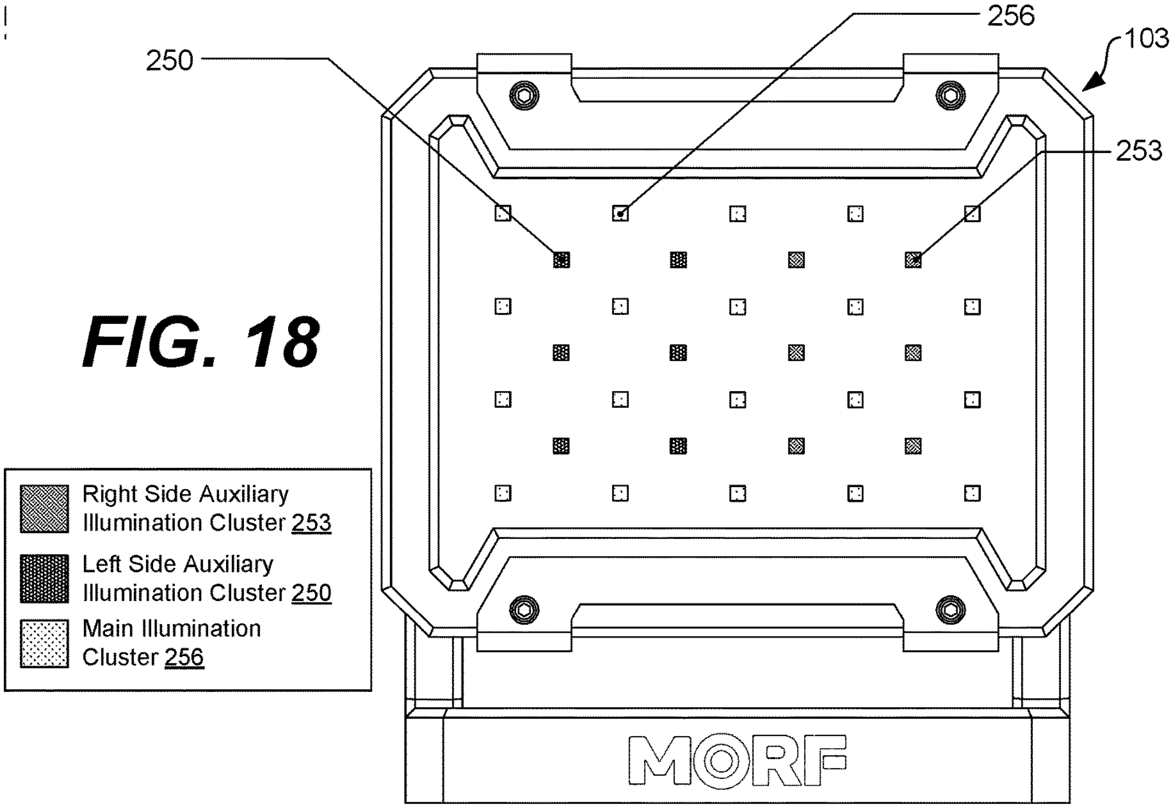
FIG. 18 is a front elevation view of the primary light-emitting panel in accordance with various embodiments of the present disclosure.

Referring now to FIGS. 17 and 18, FIG. 17 is a partial front view of the primary light-emitting panel 103 and a full perspective of an auxiliary light-emitting panel 106, and FIG. 18 is a front elevation view of the primary light-emitting panel 103 in accordance with various embodiments of the present disclosure. In various embodiments, the primary light-emitting panel 103 may include a first auxiliary illumination cluster 250, a second auxiliary illumination cluster 253, and a main illumination cluster 256. For instance, the first auxiliary illumination cluster 250 may include a first plurality of LEDs, the second auxiliary illumination cluster 253 may include a second plurality of LEDs, and the main illumination cluster 256 may include a third plurality of LEDs, or other similar light sources.

In some embodiments, when an auxiliary light-emitting panel 106 is removed from the primary light-emitting panel 103, a cluster of dormant lights (e.g., LEDs) on the primary light-emitting panel 103 will illuminate to account for reduced illumination provided by the removed one of the auxiliary light-emitting panels 106. In other words, the lights help maintain the brightness of the primary light-emitting panel which is lessened when one or more of the auxiliary light-emitting panels 106 are detached.

The primary light-emitting panel 106 may include processing circuitry to selecting illuminate the first auxiliary illumination cluster 250, the second auxiliary illumination cluster 253, and/or the main illumination cluster 256 based on the presence of one or more auxiliary light-emitting panels 106. For instance, when a right one of the auxiliary light-emitting panels 106 is removed, the processing circuitry may detect the removal (e.g., using a sensor or change in resistance or capacitance), and may direct the second auxiliary illumination cluster 253 (e.g., positioned on the right side, for example) to illuminate with the main illumination cluster 256. Similarly, when a left one of the auxiliary light-emitting panels 106 is removed, the processing circuitry may detect the removal (e.g., using a sensor or change in resistance or capacitance), and may direct the first auxiliary illumination cluster 253 (e.g., positioned on the left side, for example) to illuminate with the main illumination cluster 256. As such, each auxiliary light-emitting panel 106 has its own set of LED clusters that are activated when the auxiliary light-emitting panel 106 is detached from the primary light-emitting panel 103.

Figure 19:
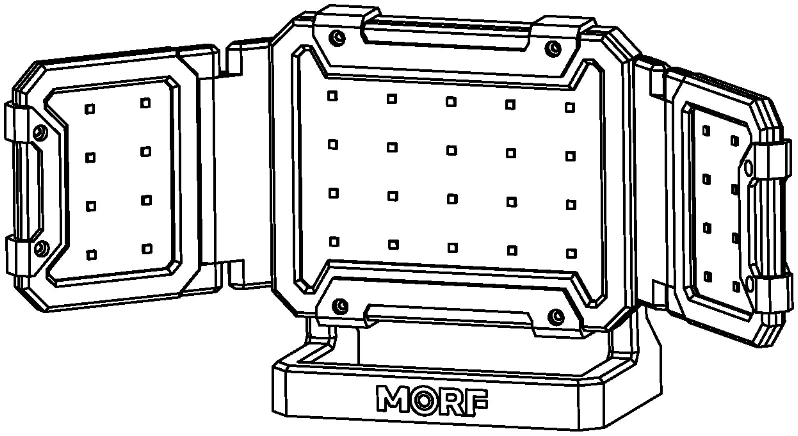
FIG. 19 is a front perspective view of the multi-panel lighting device powered off in accordance with various embodiments of the present disclosure.
Figure 20:
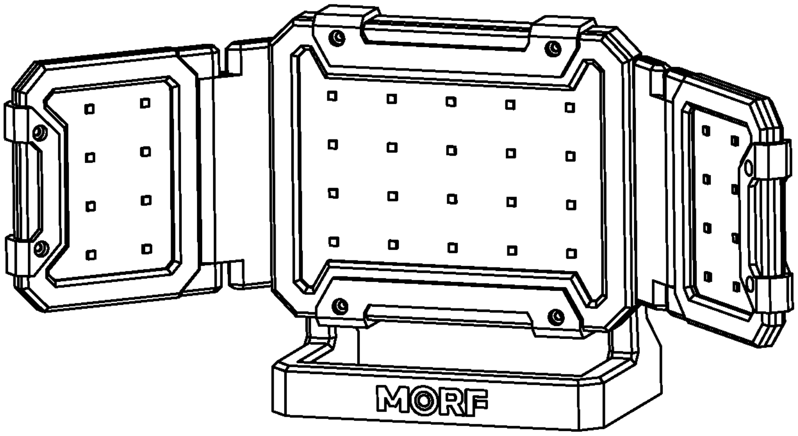
FIG. 20 is a front perspective view of the multi-panel lighting device powered on in accordance with various embodiments of the present disclosure.
Figure 21:
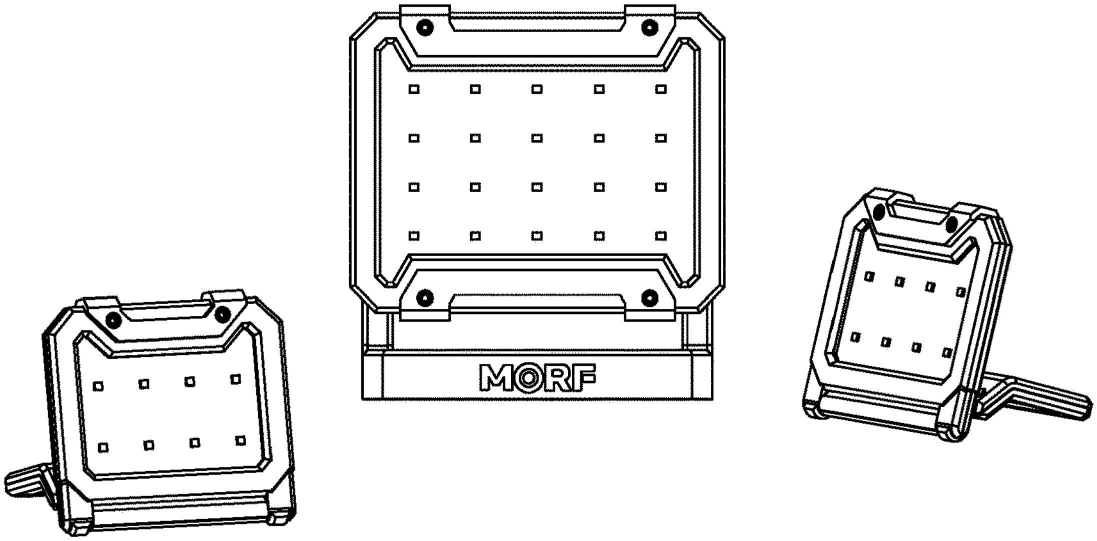
FIG. 21 is a front perspective view of auxiliary light-emitting panels powered off in accordance with various embodiments of the present disclosure.
Figure 22:
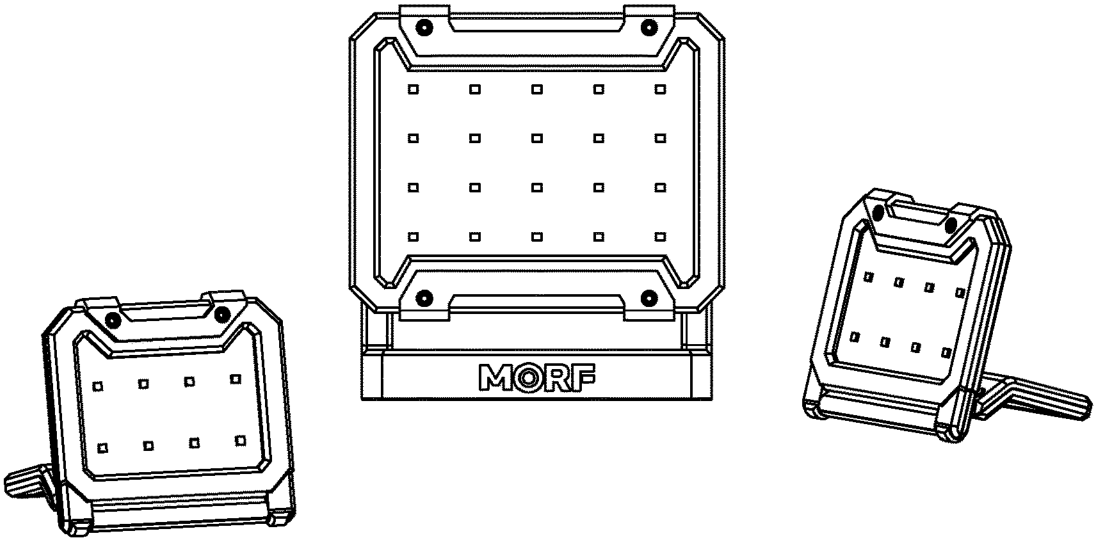
FIG. 22 is a front perspective view of auxiliary light-emitting panels powered on in accordance with various embodiments of the present disclosure.
Figure 23:
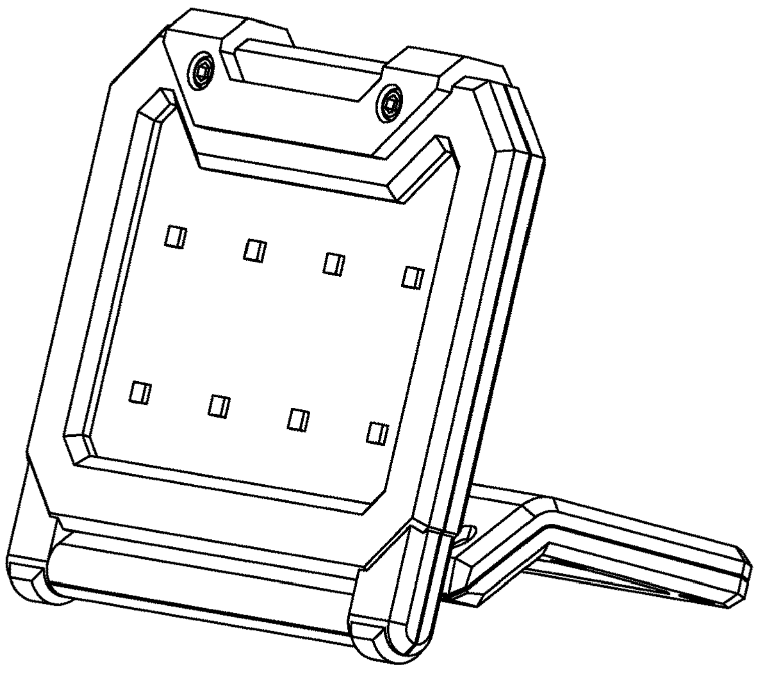
FIG. 23 is a front perspective view of an auxiliary light-emitting panel powered off in accordance with various embodiments of the present disclosure.
Figure 24:
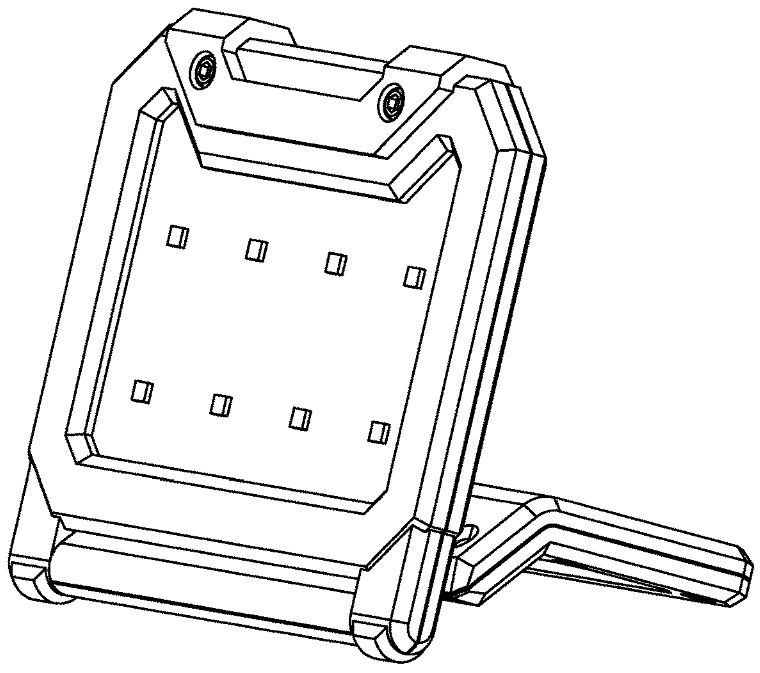
FIG. 24 is a front perspective view of an auxiliary light-emitting panel powered on in accordance with various embodiments of the present disclosure.

FIG. 19 is a front perspective view of the multi-panel lighting device 100 powered off in accordance with various embodiments of the present disclosure, whereas FIG. 20 is a front perspective view of the multi-panel lighting device 100 powered on in accordance with various embodiments of the present disclosure. FIG. 21 is a front perspective view of the auxiliary light-emitting panels 106 and the primary light-emitting panel 103 powered off, and FIG. 22 is a front perspective view of the auxiliary light-emitting panels 106 and the primary light-emitting panel 103 powered on in accordance with various embodiments of the present disclosure. FIG. 23 is a front perspective view of an auxiliary light-emitting panel 106 powered off and FIG. 24 is a front perspective view of an auxiliary light-emitting panel 106 powered on in accordance with various embodiments of the present disclosure.

Figure 25:
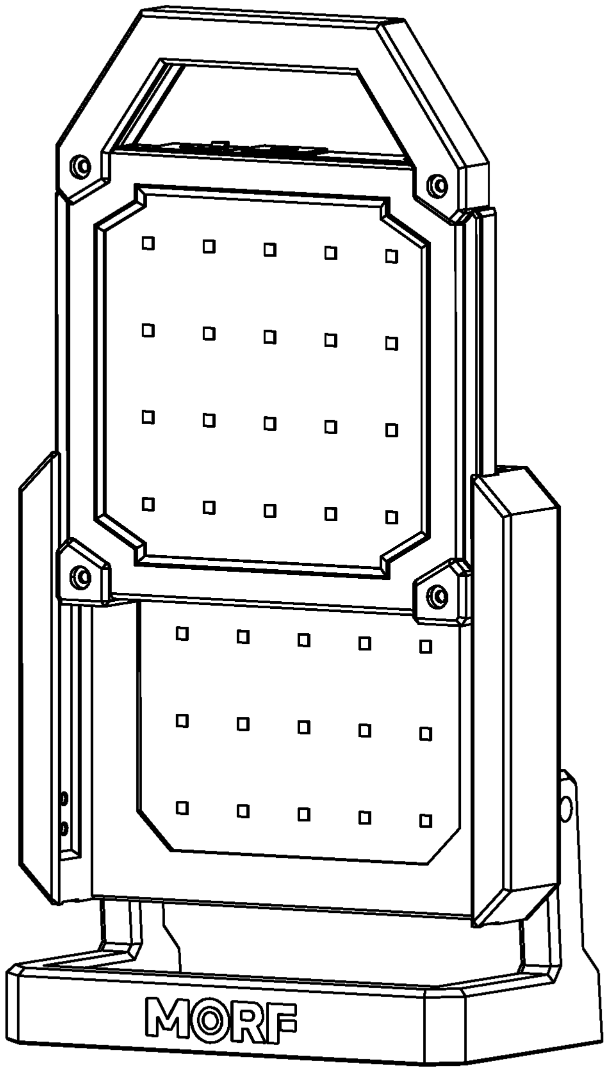
FIGS. 25 and 26 are perspective views of a multi-panel lighting device including a primary light-emitting panel and an auxiliary light-emitting panel in accordance with various embodiments of the present disclosure.
Figure 26:
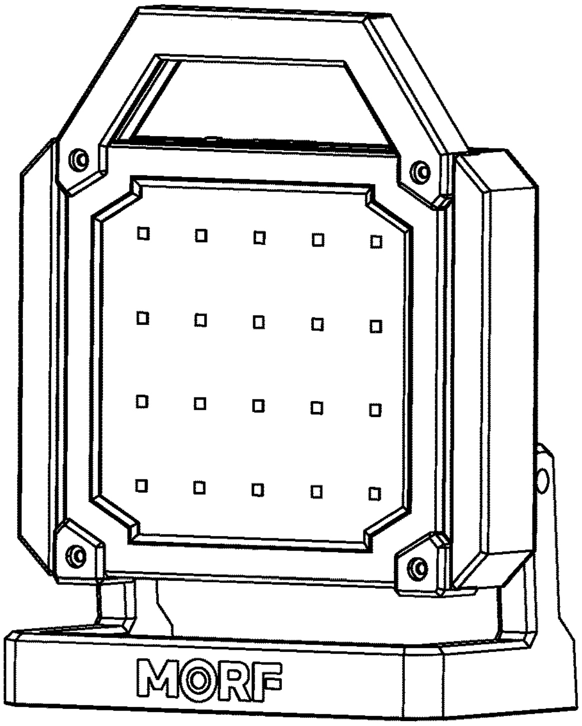
Figure 27:
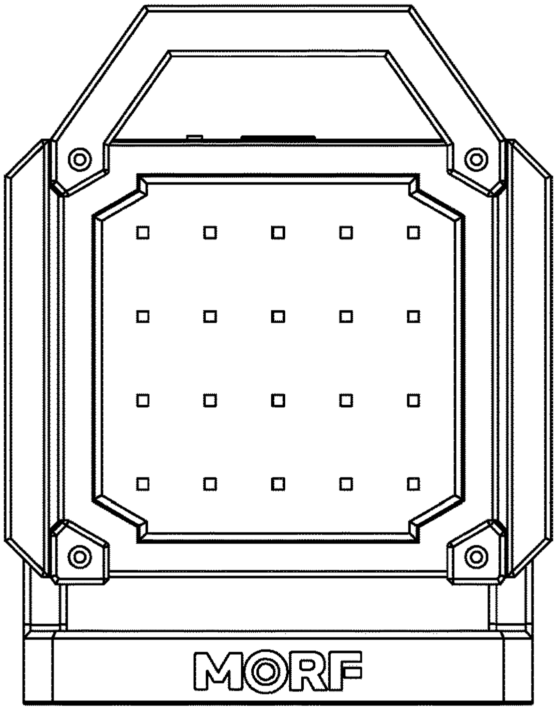
FIG. 27 is a front view of the multi-panel lighting device including a primary light-emitting panel and an auxiliary light-emitting panel in accordance with various embodiments of the present disclosure.
Figure 28:
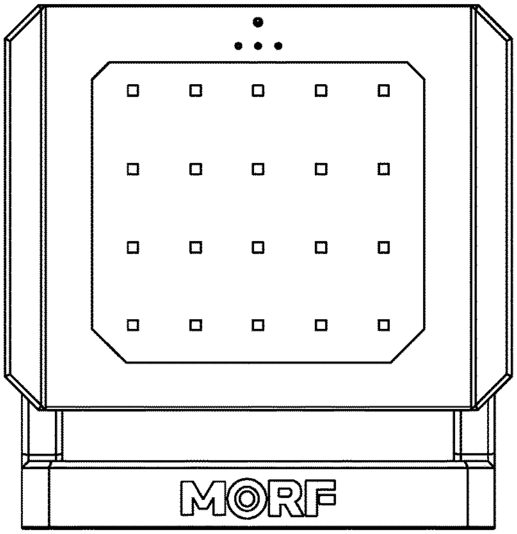
FIG. 28 is a front view of the primary light-emitting panel of the multi-panel lighting device of FIGS. 25 and 26 in accordance with various embodiments of the present disclosure.
Figure 29:
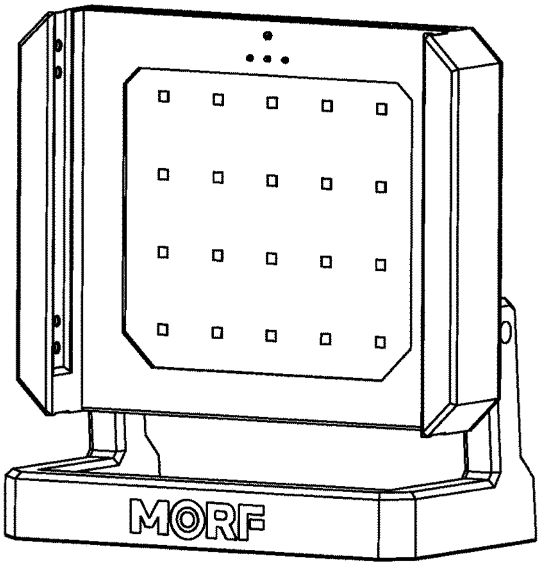
FIG. 29 is a front perspective view of the primary light-emitting panel of the multi-panel lighting device of FIGS. 25 and 26 in accordance with various embodiments of the present disclosure.
Figure 32:
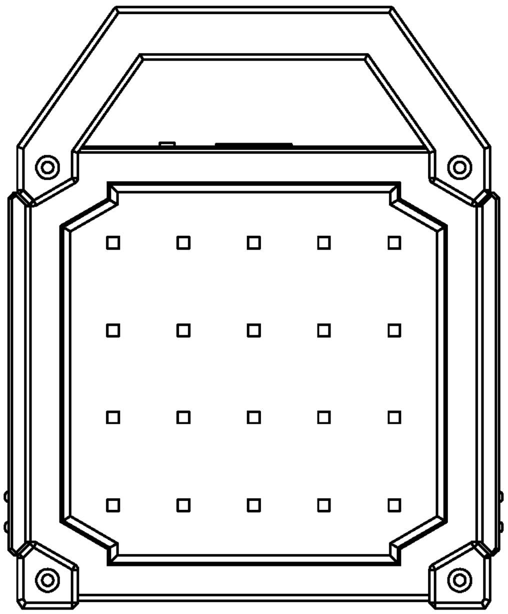
FIG. 32 is a front view of the auxiliary light-emitting panel of the multi-panel lighting device of FIGS. 25 and 26 in accordance with various embodiments of the present disclosure.

Turning now to FIGS. 25-32, various views of another embodiment for a multi-panel lighting device 100 are shown in accordance with various embodiments. Specifically, FIGS. 25 and 26 are perspective views of a multi-panel lighting device 100 including a primary light-emitting panel 103 and an auxiliary light-emitting panel 106, FIG. 27 is a front view of the multi-panel lighting device 100, FIG. 28 is a front view of the primary light-emitting panel 103 of the multi-panel lighting device 100, FIG. 29 is a front perspective view of the primary light-emitting panel 103, FIG. 30 is a side perspective view of the auxiliary light-emitting panel 106, FIG. 31 is a front perspective view of the auxiliary light-emitting panel 106, and FIG. 32 is a front view of the auxiliary light-emitting panel 106 in accordance with various embodiments of the present disclosure.

Referring to FIGS. 25-32 collectively, the multi-panel lighting device 100 includes a primary light-emitting panel 103 and an auxiliary light-emitting panel 106. Specifically, FIGS. 25-27 depicts a single auxiliary light-emitting panel 106; however, it is understood that the multi-panel lighting device 100 can include other suitable number of auxiliary light-emitting panels 106, such as two, three, four, or other desired number.

The primary light-emitting panel 103 may include a primary light-emitting region 109, a primary power supply (not shown), processing circuitry (not shown), and a base 112, among other components as will be described. Similarly, the auxiliary light-emitting panels 106 may include an auxiliary light-emitting region 115. It is understood that one or more light-emitting diodes (LEDs), bulbs, or other lighting apparatus may be positioned in the primary light-emitting panel 103 and the auxiliary light-emitting panels 106, such that light is illuminated in the auxiliary light-emitting regions 115 and the primary light-emitting region 109.

The primary light-emitting panel 103 may be pivotably coupled to the base 112, such that the primary light-emitting panel 103 may be rotated about an axis parallel to a surface on which the primary light-emitting panel 103 and the base 112 rest. Additionally, as shown in FIG. 1, the base 112 may raise the primary light-emitting panel 103 from a surface on which the base 112 rests. In alternative embodiments, however, the primary light-emitting panel 103 may be configured to be positioned directly on a ground surface.

The auxiliary light-emitting panel 106 may be slidably coupled and detachably attached to the primary light-emitting panel 103. However, when removed, the auxiliary light-emitting panel 106 may operate and illuminate independent of the primary light-emitting panel 103. As such, the auxiliary light-emitting panel 106 may include an auxiliary power supply (not shown) separate and independent from the primary power supply, processing circuitry (not shown), a panel kickstand 266, a handle 269, as well as other components. More specifically, the auxiliary light-emitting panel 106 may include an auxiliary power supply.

The auxiliary light-emitting panel 106 may be configured to detachably attach to and/or slide into a chamber (or a slide area) defined by the primary light-emitting panel 103. For instance, as shown in FIG. 1, the auxiliary light-emitting panel 106 may slide into a chamber be engaging with rails 271*a*, 271*b*. As such, the auxiliary light-emitting panels 106 is positioned directly adjacent or in front of the primary light-emitting panel 103 without contacting a ground surface. In other words, the primary light-emitting panel 103 has a body defining a first rail 271*a* and a second rail 271*b*, the primary light-emitting region being positioned between the first rail 271*a* and the second rail 271*b*. The auxiliary light-emitting panel 106 may include projections or corresponding rails (not shown) configured to engage with and slide within the first rail 271*a* and the second rail 271*b*.

In addition to the slidable coupling, the coupling between the auxiliary light-emitting panel 106 and the primary light-emitting panel 103 may include a snap connection, an interference connection, a magnetic connection, an electrical connection, and/or other suitable connection. To this end, the auxiliary light-emitting panel 106 may include one or more embedded magnets (not shown) configured to couple to a magnet of the primary light-emitting panel 103 such that a magnetic connection is formed between the auxiliary light-emitting panel 106 and the primary light-emitting panel 103. The magnet may assist in aligning electrical contacts in some embodiments such that a power supply of the primary light-emitting panel 103 may directly power the of the auxiliary light-emitting panel 106 and/or recharge a power supply of the auxiliary light-emitting panel 106.

The multi-panel lighting device 100 may include a switch (not shown) that detects placement of the auxiliary light-emitting panel 106 in front of the primary light-emitting panel 103. As such, the processing circuitry of the primary light-emitting panel 103 may be configured to turn off the primary light-emitting region 109 and any LEDs (or other lighting devices) therein when the auxiliary light-emitting panel 106 is slidably engaged with and/or in front of the primary light-emitting panel 103. Similarly, the processing circuitry of the primary light-emitting panel 103 may be configured to turn on the primary light-emitting region 109 and any LEDs (or other lighting devices) therein when the auxiliary light-emitting panel 106 is removed from and/or no longer in front of the primary light-emitting panel 103. In some embodiments, the switch is an electrical connection that detects, for instance, a change in resistance or capacitance, although other sensors (such as object detection sensors) may be employed.

The base 112 of the primary light-emitting panel 103 may include vertically-extending legs 124*a*, 124*b* coupled to ground members 127*a*, 127*b*, where a horizontal ground support 130 extends between the ground members 127. The first ground member 127*a* may be coupled and perpendicular to the first vertically-extending leg 124*a*, the second ground member 127*b* may be coupled and perpendicular to the second vertically-extending leg 124*b*, and the horizontal ground support 130 may be coupled to a front portion of the first ground member 127*a* and the second ground member 127*b*.

The primary light-emitting panel 103 and/or the auxiliary light-emitting panel 106 may include one or more bumpers 133*a*, 133*b* that prevent damage to the multi-panel lighting device 100 during operation. For instance, the bumpers 133 may come into contact with the ground and other surfaces such that any processing circuitry or lighting apparatus are not damaged or broken during transportation or use. As such, the bumpers 133 may be formed of rubber, soft plastic, or other suitable force absorbing material.

The features, structures, or characteristics described above may be combined in one or more embodiments in any suitable manner, and the features discussed in the various embodiments are interchangeable, if possible, even if the embodiments are described separately. In the following description, numerous specific details are provided in order to fully understand the embodiments of the present disclosure. However, a person skilled in the art will appreciate that the technical solution of the present disclosure may be practiced without one or more of the specific details, or other methods, components, and materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims. The terms "first," "second," etc. are used only as labels, rather than a limitation for a number of the objects.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A multi-panel lighting device, comprising:

a primary light-emitting panel comprising a primary power supply, a primary light-emitting region, and a base; and at least two auxiliary light-emitting panels coupled and detachably attached to the primary light-emitting panel, the at least two auxiliary light-emitting panels each being configured to be detachably attached to at least one of a first side and a second side of the primary light-emitting panel, and the at least two auxiliary light-emitting panels each comprising an auxiliary light-emitting region and an auxiliary power supply.

2. The multi-panel lighting device according to claim 1, wherein the at least two auxiliary light-emitting panels comprise:

a first auxiliary light-emitting panel comprising a first auxiliary power supply; and a second auxiliary light-emitting panel comprising a second auxiliary power supply.

3. The multi-panel lighting device according to claim 2, wherein the first auxiliary light-emitting panel and the second auxiliary light-emitting panel each comprise:

a lighting panel rotatably coupled to a panel base;

at least one embedded magnet configured to couple to a magnet of the primary light-emitting panel; and at least one charging contact configured to couple to a charging contact of the primary light-emitting panel.

4. The multi-panel lighting device according to claim 3, wherein the panel base comprises a first section that is substantially uniform and a second section comprising a handle aperture.

5. The multi-panel lighting device according to claim 4, wherein the lighting panel is rotatably coupled to the panel base, such that an angle between the lighting panel and the panel base is adjustable between approximately 0 to 270 degrees.

6. The multi-panel lighting device according to claim 2, wherein the primary light-emitting panel comprises a first auxiliary illumination cluster, a second auxiliary illumination cluster, and a main illumination cluster, each comprising a plurality of light sources.

7. The multi-panel lighting device according to claim 6, wherein the first auxiliary illumination cluster comprises a first plurality of LEDs, the second auxiliary illumination cluster comprises a second plurality of LEDs, and the main illumination cluster comprises a third plurality of LEDs.

8. The multi-panel lighting device according to claim 6, wherein the primary light-emitting panel comprises processing circuitry configured to:

illuminate only the main illumination cluster when the first auxiliary light-emitting panel and the second auxiliary light-emitting panel are attached to the primary light-emitting panel;

detect when the first auxiliary light-emitting panel is detached from the primary light-emitting panel; and illuminate the first auxiliary illumination cluster and the main illumination cluster in response to the first auxiliary light-emitting panel being detached from the primary light-emitting panel.

9. The multi-panel lighting device according to claim 1, wherein the base raises the primary light-emitting panel from a surface on which the base rests and the primary light-emitting panel is pivotably coupled to the base.

10. The multi-panel lighting device according to claim 1, wherein the primary light-emitting panel comprises processing circuitry configured to power the at least two auxiliary light-emitting panels and recharge the auxiliary power supply of the at least two auxiliary light-emitting panels.

11. The multi-panel lighting device according to claim 10, wherein the processing circuitry is further configured to illuminate the primary light-emitting panel in response to a toggling of a switch located on the primary light-emitting panel and the at least two auxiliary light-emitting panels when attached to the primary light-emitting panel.

12. The multi-panel lighting device according to claim 10, wherein the processing circuitry is further configured to:

detect when the second auxiliary light-emitting panel is detached from the primary light-emitting panel; and illuminate the second auxiliary illumination cluster and the main illumination cluster in response to the second auxiliary light-emitting panel being detached from the primary light-emitting panel.

13. The multi-panel lighting device according to claim 10, wherein the processing circuitry is further configured to detect a presence or lack thereof of the first auxiliary light-emitting panel and/or the second auxiliary light-emitting panel using a sensor.

14. The multi-panel lighting device according to claim 10, wherein the processing circuitry is further configured to detect a presence or lack thereof of the first auxiliary light-emitting panel and/or the second auxiliary light-emitting panel using a change in resistance or capacitance.

15. A multi-panel lighting device, comprising:

a primary light-emitting panel comprising a primary power supply, a primary light-emitting region, processing circuitry, and a base; and an auxiliary light-emitting panel slidably coupled and detachably attached to the primary light-emitting panel, the auxiliary light-emitting panel comprising an auxiliary light-emitting region and an auxiliary power supply, wherein the processing circuitry of the primary light-emitting panel is configured to turn off the primary light-emitting region when the auxiliary light-emitting panel is slidably engaged with or in front of the primary light-emitting panel.

16. The multi-panel lighting device according to claim 15, wherein:

the primary light-emitting panel has a body defining a first rail and a second rail, the primary light-emitting region being positioned between the first rail and the second rail; and the auxiliary light-emitting panel comprises projections configured to engage with and slide within the first rail and the second rail.

17. The multi-panel lighting device according to claim 15, wherein the processing circuitry of the primary light-emitting panel is further configured to turn on the primary light-emitting region when the auxiliary light-emitting panel is removed from or no longer in front of the primary light-emitting panel.

18. The multi-panel lighting device according to claim 17, wherein the processing circuitry detects a presence or a lack of the auxiliary light-emitting panel based at least in part on a switch.

19. The multi-panel lighting device according to claim 15, wherein the primary light-emitting panel is pivotably coupled to the base.

20. A multi-panel lighting device, comprising:

a primary light-emitting panel comprising a primary power supply, a primary light-emitting region, and a base; and at least two auxiliary light-emitting panels coupled and detachably attached to the primary light-emitting panel, the at least two auxiliary light-emitting panels each being configured to be detachably attached to at least one of a first side and a second side of the primary light-emitting panel, and the at least two auxiliary light-emitting panels each comprising an auxiliary light-emitting region and an auxiliary power supply, wherein the at least two auxiliary light-emitting panels comprise: a first auxiliary light-emitting panel comprising a first auxiliary power supply; and a second auxiliary light-emitting panel comprising a second auxiliary power supply.

* * * * *